United States Patent
Solomon et al.

(10) Patent No.: US 9,024,876 B2
(45) Date of Patent: May 5, 2015

(54) ABSOLUTE AND RELATIVE POSITIONING SENSOR FUSION IN AN INTERACTIVE DISPLAY SYSTEM

(71) Applicant: Interphase Corporation, Plano, TX (US)

(72) Inventors: Yoram Solomon, Plano, TX (US); Branislav Kisacanin, Plano, TX (US)

(73) Assignee: Interphase Corporation, Carrollton, TX (US)

( * ) Notice: Subject to any disclaimer, the term of this patent is extended or adjusted under 35 U.S.C. 154(b) by 0 days.

(21) Appl. No.: 14/018,695

(22) Filed: Sep. 5, 2013

(65) Prior Publication Data
US 2014/0062881 A1     Mar. 6, 2014

Related U.S. Application Data

(60) Provisional application No. 61/697,342, filed on Sep. 6, 2012, provisional application No. 61/700,561, filed on Sep. 13, 2012.

(51) Int. Cl.
*G09G 5/00* (2006.01)
*G06F 3/033* (2013.01)

(52) U.S. Cl.
CPC .............. *G09G 5/006* (2013.01); *G06F 3/033* (2013.01)

(58) Field of Classification Search
CPC ....... G06F 3/0304; G06F 3/033; G06F 3/042; G06F 3/0312; G06F 3/0317; G06F 3/0321; G06F 3/03542; G06F 3/038; G06F 3/0383; G06F 3/0386; G09G 5/006; G09G 5/08

USPC ................... 345/156–158, 182–183
See application file for complete search history.

(56) References Cited

U.S. PATENT DOCUMENTS

| | | | |
|---|---|---|---|
| 4,799,055 A | 1/1989 | Nestler et al. |
| 6,737,591 B1 | 5/2004 | Lapstun et al. |
| 7,826,641 B2 | 11/2010 | Mandella et al. |
| 7,961,909 B2 | 6/2011 | Mandella et al. |
| 8,139,029 B2 | 3/2012 | Boillot et al. |
| 8,217,997 B2 | 7/2012 | Solomon et al. |
| 8,225,343 B2 | 7/2012 | Miller, IV |

(Continued)

FOREIGN PATENT DOCUMENTS

| | | |
|---|---|---|
| EP | 0200284 B1 | 9/1993 |
| EP | 2 226 707 A1 | 9/2010 |

(Continued)

OTHER PUBLICATIONS

International Search Report, and Written Opinion of the International Searching Authority, International Application No. PCT/US2013/058269 (KIPO, Dec. 26, 2013).

(Continued)

*Primary Examiner* — Kenneth Bukowski
(74) *Attorney, Agent, or Firm* — Anderson & Levine, L.L.P.

(57) ABSTRACT

An interactive display system including a wireless pointing device, and positioning circuitry capable of determining absolute and relative positions of the display at which the pointing device is aimed. An error value between the absolute position and an estimated or actual relative position at the point in time of the absolute position is determined, and a compensation factor is determined from this error value that is applied to subsequent relative positioning results.

54 Claims, 10 Drawing Sheets

(56) References Cited

U.S. PATENT DOCUMENTS

| | | | |
|---|---|---|---|
| 8,441,438 B2 | 5/2013 | Ye et al. | |
| 8,446,364 B2 | 5/2013 | Solomon | |
| 8,471,812 B2 | 6/2013 | Bunch | |
| 2003/0046256 A1 | 3/2003 | Hugosson et al. | |
| 2005/0168437 A1 | 8/2005 | Carl et al. | |
| 2006/0152487 A1 | 7/2006 | Grunnet-Jepsen et al. | |
| 2006/0187196 A1 | 8/2006 | Underkoffler et al. | |
| 2007/0236451 A1* | 10/2007 | Ofek et al. | 345/157 |
| 2008/0042973 A1 | 2/2008 | Zhao et al. | |
| 2008/0080789 A1 | 4/2008 | Marks et al. | |
| 2008/0106517 A1* | 5/2008 | Kerr et al. | 345/158 |
| 2008/0212833 A1 | 9/2008 | Page | |
| 2008/0278445 A1 | 11/2008 | Sweetser et al. | |
| 2011/0025603 A1 | 2/2011 | Underkoffler et al. | |
| 2011/0043448 A1 | 2/2011 | Yamamoto | |
| 2011/0063206 A1 | 3/2011 | Karaoguz et al. | |
| 2011/0227825 A1 | 9/2011 | Liberty et al. | |
| 2011/0227827 A1* | 9/2011 | Solomon et al. | 345/158 |
| 2011/0298710 A1 | 12/2011 | Ruckhaeberle et al. | |
| 2012/0038549 A1* | 2/2012 | Mandella et al. | 345/156 |
| 2012/0086725 A1* | 4/2012 | Joseph et al. | 345/629 |
| 2013/0063350 A1 | 3/2013 | Takeda et al. | |

FOREIGN PATENT DOCUMENTS

| | | |
|---|---|---|
| WO | 2006-137077 A1 | 12/2006 |
| WO | 2010-075136 A2 | 7/2010 |

OTHER PUBLICATIONS

Hightower et al., "SpotON: An Indoor 3D Location Sensing Technology Based on RF Signal Strength", UW CSE Technical Report #Feb. 2, 2000 (University of Washington, 2000).

U.S. Appl. No. 14/056,286, filed Oct. 17, 2013.

Tsang, "Error Reduction Techniques for a MEMS Accelerometer-based Digital Input Device", Master's Thesis (The Chinese University of Hong Kong, 2008).

* cited by examiner

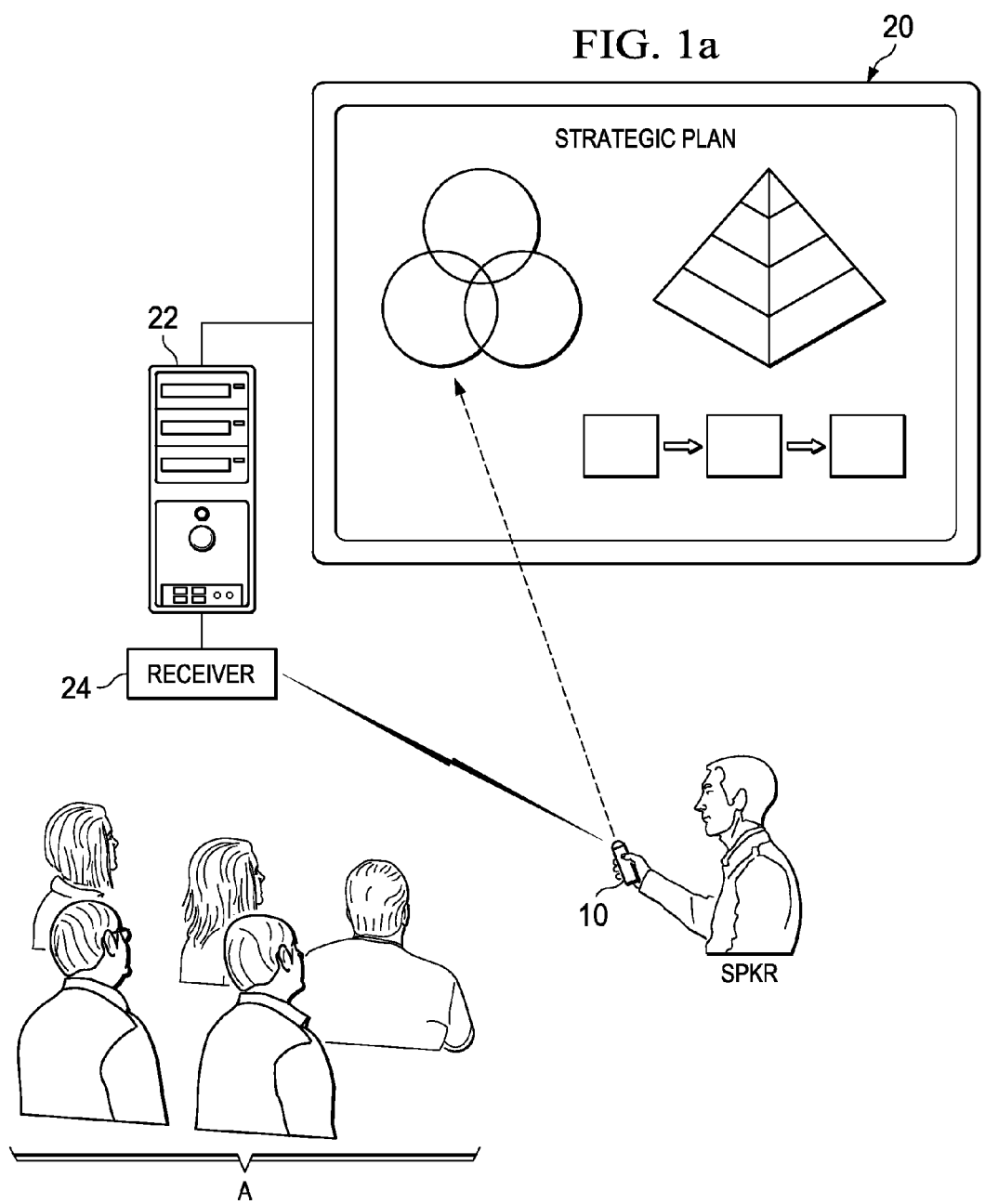

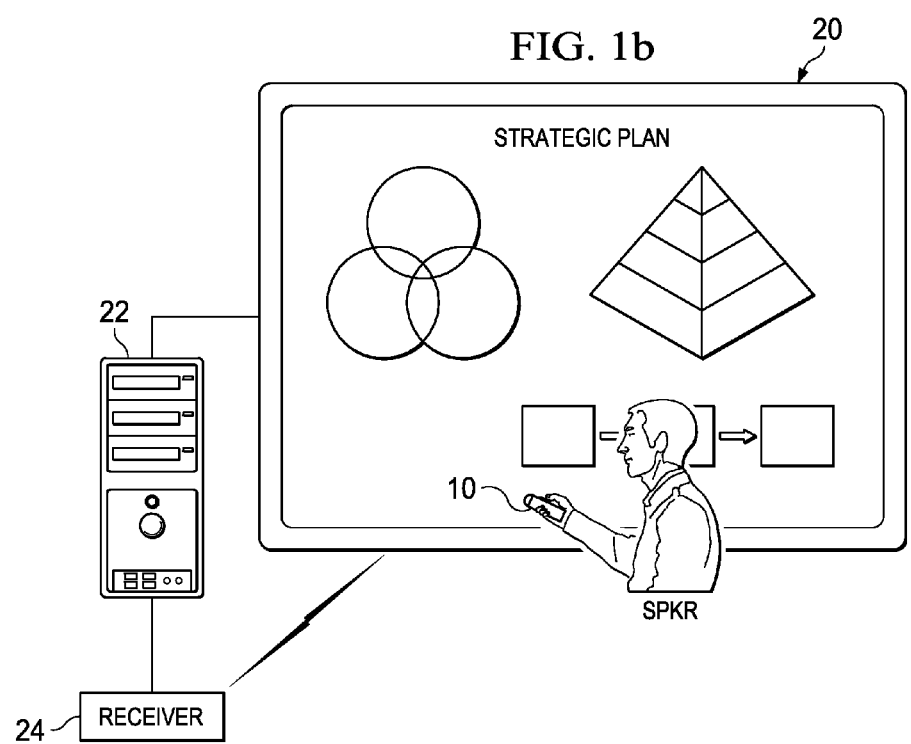

US 9,024,876 B2

ABSOLUTE AND RELATIVE POSITIONING SENSOR FUSION IN AN INTERACTIVE DISPLAY SYSTEM

CROSS-REFERENCE TO RELATED APPLICATIONS

This application claims priority, under 35 U.S.C. §119(e), of Provisional Application No. 61/697,342, filed Sep. 6, 2012; Provisional Application No. 61/700,561, filed Sep. 13, 2012; all incorporated herein by this reference.

STATEMENT REGARDING FEDERALLY SPONSORED RESEARCH OR DEVELOPMENT

Not applicable.

BACKGROUND OF THE INVENTION

This invention is in the field of interactive display systems. Embodiments of this invention are more specifically directed to the positioning of the location at a display to which a control device is pointing during the interactive operation of a computer system.

The ability of a speaker to communicate a message to an audience is generally enhanced by the use of visual information, in combination with the spoken word. In the modern era, the use of computers and associated display systems to generate and display visual information to audiences has become commonplace, for example by way of applications such as the POWERPOINT presentation software program available from Microsoft Corporation. For large audiences, such as in an auditorium environment, the display system is generally a projection system (either front or rear projection). For smaller audiences such as in a conference room or classroom environment, flat-panel (e.g., liquid crystal) displays have become popular, especially as the cost of these displays has fallen over recent years. New display technologies, such as small projectors ("pico-projectors"), which do not require a special screen and thus are even more readily deployed, are now reaching the market. For presentations to very small audiences (e.g., one or two people), the graphics display of a laptop computer may suffice to present the visual information. In any case, the combination of increasing computer power and better and larger displays, all at less cost, has increased the use of computer-based presentation systems, in a wide array of contexts (e.g., business, educational, legal, entertainment).

A typical computer-based presentation involves the speaker standing remotely from the display system, so as not to block the audience's view of the visual information. Because the visual presentation is computer-generated and computer-controlled, the presentation is capable of being interactively controlled, to allow selection of visual content of particular importance to a specific audience, annotation or illustration of the visual information by the speaker during the presentation, and invocation of effects such as zooming, selecting links to information elsewhere in the presentation (or online), moving display elements from one display location to another, and the like. This interactivity greatly enhances the presentation, making it more interesting and engaging to the audience.

The ability of a speaker to interact, from a distance, with displayed visual content, is therefore desirable. More specifically, a hand-held device that a remotely-positioned operator could use to point to, and interact with, the displayed visual information is therefore desirable.

U.S. Pat. No. 8,217,997, issued Jul. 10, 2012, entitled "Interactive Display System", commonly assigned herewith and incorporated herein by reference, describes an interactive display system including a wireless human interface device ("HID") constructed as a handheld pointing device including a camera or other video capture system. The pointing device captures images displayed by the computer, including one or more human-imperceptible positioning targets inserted by the computer into the displayed image data. The location, size, and orientation of the recovered positioning target identify the aiming point of the remote pointing device relative to the display. Temporal sequencing of the positioning targets (either human-perceptible or human-imperceptible) to position the pointing device is also described.

The positioning of the aiming point of the pointing device according to the approach described in the above-referenced U.S. Pat. No. 8,217,997 is performed at a rate corresponding to the frame rate of the display system. More specifically, a new position can be determined as each new frame of data is displayed, by the combination of the new frame (and its positioning target) and the immediately previous frame (and its complementary positioning target). This approach works quite well in many situations, particularly in the context of navigating and controlling a graphical user interface in a computer system, such as pointing to and "clicking" icons, click-and-drag operations involving displayed windows and frames, and the like. A particular benefit of this approach described in U.S. Pat. No. 8,217,997, is that the positioning is "absolute", in the sense that the result of the determination is a specific position on the display (e.g., pixel coordinates). The accuracy of the positioning carried out according to this approach is quite accurate over a wide range of distances between the display and the handheld device, for example ranging from in physical contact with the display screen to tens of feet away.

But because of the dependence of the positioning rate on the display frame rate, the ability of this approach has limitations. Rapid movement of the handheld device, for example while "writing" on the display screen in an electronic interactive "white board" application, can present motion that may not be fully captured by positioning at the frame rate. In addition, time lag between movement of the handheld device and the display response can be noticeable to the user and the audience in some situations.

Conventional human interface devices based on motion sensors are known in the art. Motion sensors sense motion of the device over time, for example between sample times. Examples of motion sensors include inertial sensors such as accelerometers, gyroscopes, magnetic field sensors such as magnetometers, and visual systems such as those used in optical mice. The positioning result based on motion sensors is relative, in the sense that an absolute position of the display is not directly determined, but rather the motion sensors determine the pointed-to location relative to that at a previous point in time. However, the sample rate at which motion sensor-based pointing devices operate is not limited by the frame rate of the display, and can be much higher, assuming proper registration of the relative positioning. In addition, fewer computations are required to derive the relative positioning result, as compared with those required for absolute positioning. Unfortunately, however, because the positioning provided by these devices is relative, drift or other error can accumulate over time. Error is exacerbated for those devices relying on accelerometer motion sensing, as two integrations are required in order to convert sensed accelerations into linear distances. As such, the accuracy of relative positioning based on motion sensors is generally inferior to that of absolute positioning approaches.

To summarize, both absolute and relative systems for determining the position of a display at which a human interface device is pointing are known in the art. Absolute positioning provides good accuracy but at a relatively slow maximum rate, while relative positioning can operate at a high rate, but is vulnerable to error.

BRIEF SUMMARY OF THE INVENTION

Embodiments of this invention provide a system and method for rapidly and accurately positioning the location at a display at which a handheld human interface device is pointing during the operation of an interactive display system.

Embodiments of this invention provide such a system and method in which such positioning can be performed over a range of distances ranging from the device physically touching the display to the device being operated from across a large room.

Embodiments of this invention provide such a system and method useful in interactive white board applications in which visible content may be absent.

Embodiments of this invention provide such a system and method that can interpolate positions of the device between those produced for relative motion sample times, and that can predict upcoming positions.

Embodiments of this invention provide such a system and method that can back-correct previously calculated positions to correctly display the path indicated by the device.

Other objects and advantages of embodiments of this invention will be apparent to those of ordinary skill in the art having reference to the following specification together with its drawings.

Embodiments of this invention may be implemented into an interactive display system and method of operating the same in which a remote human interface device includes an image capture subsystem from which an absolute location at the display at which the device is pointing can be determined, and also one or more motion sensors from which relative positioning results can be determined. The absolute and relative positioning circuitry may be located in a positioning system at or within the computer system generating the displayed information, in the interface device itself, or a combination of both. The positioning system determines an absolute pointed-to location at a point in time, and calculates a relative location corresponding to that same point in time. An error value corresponding to a difference between the calculated absolute and relative locations is determined, and used to adjust relative locations generated by the positioning system based on the motion sensors.

BRIEF DESCRIPTION OF THE SEVERAL VIEWS OF THE DRAWING

FIGS. 1a and 1b are schematic perspective views of a speaker presentation being carried out using an interactive display system according to embodiments of the invention.

DETAILED DESCRIPTION OF THE INVENTION

Figure 2A:
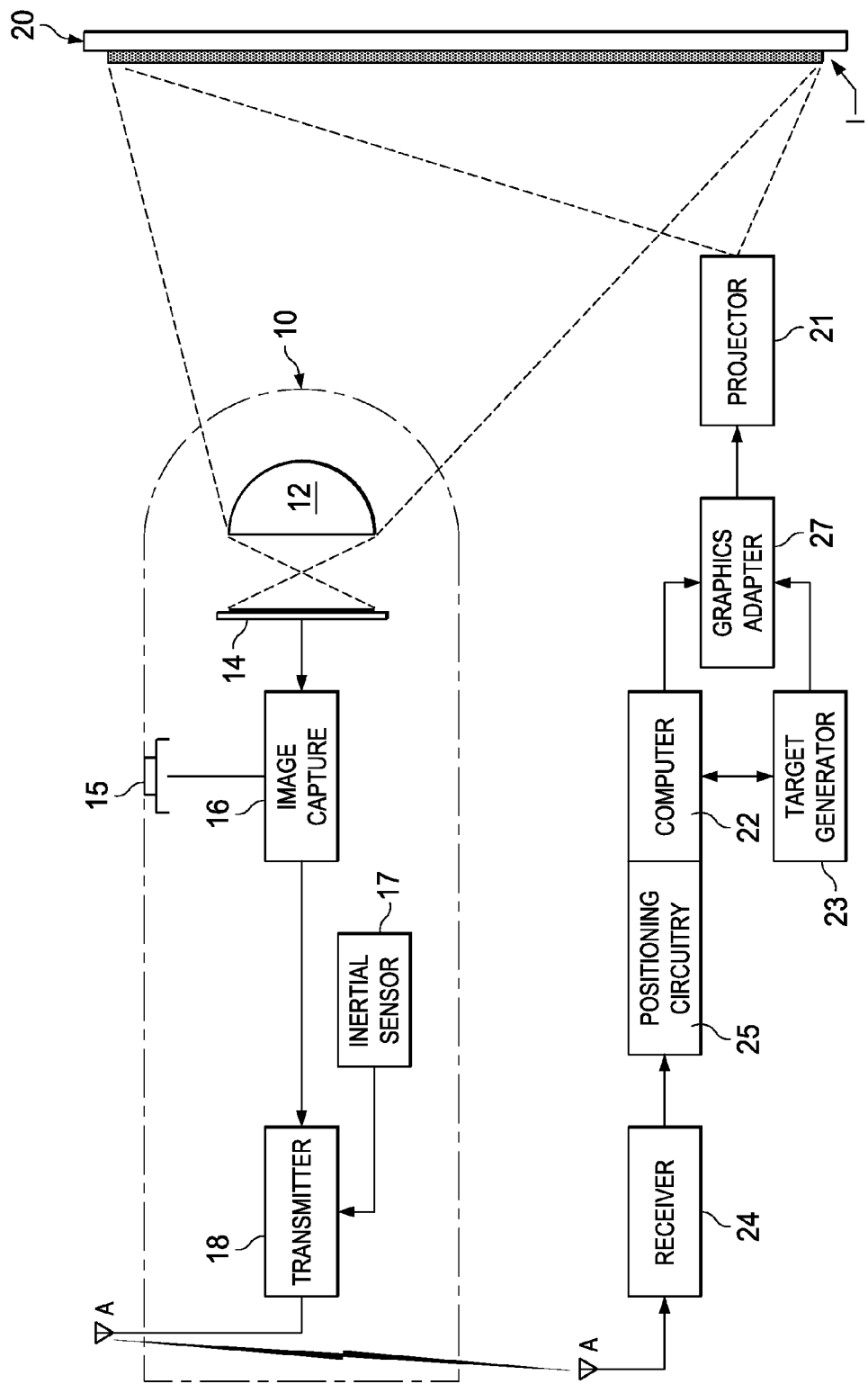
FIGS. 2a and 2b are electrical diagrams, in block form, each illustrating an interactive display system according to an embodiment of the invention.

The present invention will be described in connection with one or more of its embodiments, namely as implemented into a computerized presentation system including a display visible by an audience, as it is contemplated that this invention will be particularly beneficial when applied to such a system. However, it is also contemplated that this invention can be useful in connection with other applications, such as gaming systems, general input by a user into a computer system, and the like. Accordingly, it is to be understood that the following description is provided by way of example only, and is not intended to limit the true scope of this invention as claimed.

FIG. 1a illustrates a simplified example of an environment in which embodiments of this invention are useful. As shown in FIG. 1a, speaker SPKR is giving a live presentation to audience A, with the use of visual aids. In this case, the visual aids are in the form of computer graphics and text, generated by computer 22 and displayed on room-size graphics display 20, in a manner visible to audience A. As known in the art, such presentations are common in the business, educational, entertainment, and other contexts, with the particular audience size and system elements varying widely. The simplified example of FIG. 1a illustrates a business environment in which audience A includes several or more members viewing the presentation; of course, the size of the environment may vary from an auditorium, seating hundreds of audience members, to a single desk or table in which audience A consists of a single person.

The types of display 20 used for presenting the visual aids to audience A can also vary, often depending on the size of the presentation environment. In rooms ranging from conference rooms to large-scale auditoriums, display 20 may be a projection display, including a projector disposed either in front of or behind a display screen. In that environment, computer 22 would generate the visual aid image data and forward it to the projector. In smaller environments, display 20 may be an external flat-panel display, such as of the plasma or liquid crystal (LCD) type, directly driven by a graphics adapter in computer 22. For presentations to one or two audience members, computer 22 in the form of a laptop or desktop computer may simply use its own display 20 to present the visual information. Also for smaller audiences A, hand-held projectors (e.g., "pocket projectors" or "pico projectors") are becoming more common, in which case the display screen may be a wall or white board.

The use of computer presentation software to generate and present graphics and text in the context of a presentation is now commonplace. A well-known example of such presentation software is the POWERPOINT software program available from Microsoft Corporation. In the environment of FIG. 1*a*, such presentation software will be executed by computer 22, with each slide in the presentation displayed on display 20 as shown in this example. Of course, the particular visual information need not be a previously created presentation executing at computer 22, but instead may be a web page accessed via computer 22; a desktop display including icons, program windows, and action buttons; video or movie content from a DVD or other storage device being read by computer 22. Other types of visual information useful in connection with embodiments of this invention will be apparent to those skilled in the art having reference to this specification.

In FIG. 1*a*, speaker SPKR is standing away from display 20, so as not to block the view of audience A and also to better engage audience A. According to embodiments of this invention, speaker SPKR uses a remote human interface device (HID), in the form of pointing device 10, to remotely interact with the visual content displayed by computer 22 at display 20. This interactive use of visual information displayed by display 20 provides speaker SPKR with the ability to extemporize the presentation as deemed useful with a particular audience A, to interface with active content (e.g., Internet links, active icons, virtual buttons, streaming video, and the like), and to actuate advanced graphics and control of the presentation, without requiring speaker SPKR to be seated at or otherwise "pinned" to computer 22.

FIG. 1*b* illustrates another use of the system and method of embodiments of this invention, in which speaker SPKR closely approaches display 20 to interact with the visual content. In this example, display 20 is operating as a "white board" on which speaker SPKR may "draw" or "write" using pointing device 10 to actively draw content as annotations to the displayed content, or even on a blank screen as suggested by FIG. 1*b*. Typically, this "drawing" and "writing" would be carried out while placing pointing device 10 in actual physical contact with, or at least in close proximity to, display 20. The hardware, including display 20, in the application of FIG. 1*b* may be identical to that in the presentation example of FIG. 1*a*; indeed, embodiments of this invention allow the same speaker SPKR may interact with the same presentation in front of the same audience both from a distance as shown in FIG. 1*a*, and at display 20 as shown in FIG. 1*b*.

In either case, as described in further detail in the above-incorporated U.S. Pat. No. 8,217,997, and also below in this description in connection with particular embodiments of the invention, speaker SPKR carries out this interaction by way of pointing device 10, which is capable of capturing all or part of the image at display 20 and of interacting with a pointed-to (or aimed-at) target location at that image. Pointing device 10 in the examples of FIGS. 1*a* and 1*b* wirelessly communicates this pointed-to location at display 20 and other user commands from speaker SPKR, to receiver 24 and thus to computer 22. In this manner, according to embodiments of this invention, remote interactivity with computer 22 is carried out.

Referring to FIG. 2*a*, a generalized example of the construction of an interactive display system useful in environments such as those shown in FIG. 1*a* and 1*b*, according to embodiments of this invention, will now be described. As shown in FIG. 2*a*, this interactive display system includes pointing device 10, projector 21, and display screen 20. In this embodiment of the invention, computer 22 includes the appropriate functionality for generating the "payload" images to be displayed at display screen 20 by projector 21, such payload images intended for viewing by the audience. The content of these payload images is interactively controlled by a human user via pointing device 10, according to embodiments of this invention. To do so, computer 22 cooperates with positioning circuitry 25, which determines the position of display screen 20 to which pointing device 10 is pointing. As will become apparent from the following description, this positioning determination is based on pointing device 10 detecting one or more positioning targets displayed at display screen 20.

In its payload image generation function, computer 22 will generate or have access to the visual information to be displayed (i.e., the visual "payload" images), for example in the form of a previously generated presentation file stored in memory, or in the form of active content such as computer 22 may retrieve over a network or the Internet; for a "white board" application, the payload images will include the inputs provided by the user via pointing device 10, typically displayed on a blank background. This human-visible payload image frame data from computer 22 will be combined with positioning target image content generated by target generator function 23 that, when displayed at graphics display 20, can be captured by pointing device 10 and used by positioning circuitry 25 to deduce the location pointed to by pointing device 10. Graphics adapter 27 includes the appropriate functionality suitable for presenting a sequence of frames of image data, including the combination of the payload image data and the positioning target image content, in the suitable display format, to projector 21. Projector 21 in turn projects the corresponding images I at display screen 20, in this projection example.

The particular construction of computer 22, positioning circuitry 25, target generator circuitry 23, and graphics adapter 27 can vary widely. For example, it is contemplated that a single personal computer or workstation (in desktop, laptop, or other suitable form), including the appropriate processing circuitry (CPU, or microprocessor) and memory, can be constructed and programmed to perform the functions of generating the payload images, generating the positioning target, combining the two prior to or by way of graphics adapter 27, as well as receiving and processing data from pointing device 10 to determine the pointed-to location at the displayed image. Alternatively, it is contemplated that separate functional systems external to computer 22 may carry out one or more of the functions of target generator 23, receiver 24, and positioning circuitry 25, such that computer 22 can be realized as a conventional computer operating without modification; in this event, graphics adapter 27 could itself constitute an external function (or be combined with one or more of the other functions of target generator 23, receiver 24, and positioning circuitry 25, external to computer 22), or alternatively be realized within computer 22, to which output from target generator 23 is presented. Other various alternative implementations of these functions are also contemplated. In any event, it is contemplated that computer 22, positioning circuitry 25, target generator 23, and other functions involved in the generation of the images and positioning targets displayed at graphics display 20, will include the appropriate program memory in the form of computer-readable media storing computer program instructions that, when executed by its processing circuitry, will carry out the various functions and operations of embodiments of the invention as described in this specification. It is contemplated that those skilled in the art having reference to this specification will be readily able to arrange the appropriate computer hardware and corresponding computer programs for implementation of these embodiments of the invention, without undue experimentation.

Pointing device 10 in this example includes a camera function consisting of optical system 12 and image sensor 14. With pointing device 10 aimed at display 20, image sensor 14 is exposed with the captured image, which corresponds to all or part of image I at display 20, depending on the distance between pointing device 10 and display 20, the focal length of lenses within optical system 12, and the like. Image capture subsystem 16 includes the appropriate circuitry known in the art for acquiring and storing a digital representation of the captured image at a particular point in time selected by the user, or as captured at each of a sequence of sample times. Pointing device 10 also includes actuator 15, which is a conventional push-button or other switch by way of which the user of pointing device 10 can provide user input in the nature of a mouse button, to actuate an image capture, or for other functions as will be described below and as will be apparent to those skilled in the art. In this example, one or more inertial sensors 17 are also included within pointing device 10, to assist or enhance user interaction with the displayed content; examples of such inertial sensors include accelerometers, magnetic sensors (i.e., for sensing orientation relative to the earth's magnetic field), gyroscopes, and other inertial sensors.

In this example of FIG. 2a, pointing device 10 is operable to forward, to positioning circuitry 25, signals that correspond to the captured image acquired by image capture subsystem 16. This communications function is performed by wireless transmitter 18 in pointing device 10, along with its internal antenna A, by way of which radio frequency signals (e.g., according to a conventional standard such as Bluetooth or the appropriate IEEE 802.11 standard) are transmitted. Transmitter 18 is contemplated to be of conventional construction and operation for encoding, modulating, and transmitting the captured image data, along with other user input and control signals via the applicable wireless protocol. In this example, receiver 24 is capable of receiving the transmitted signals from pointing device 10 via its antenna A, and of demodulating, decoding, filtering, and otherwise processing the received signals into a baseband form suitable for processing by positioning circuitry 25.

It is contemplated that the particular location of positioning circuitry 25 in the interactive display system of embodiments of this invention may vary from system to system. It is not particularly important, in the general sense, which hardware subsystem (i.e., the computer driving the display, the pointing device, a separate subsystem in the video data path, or some combination thereof) performs the determination of the pointed-to location at display 20. In the example shown in FIG. 2a, as described above, positioning circuitry 25 is deployed in combination with computer 22 and target generator function 23, in a system that combines the functions of generating the displayed images I and of determining the location at the displayed images I at which pointing device 10 is aimed (and decoding the commands associated therewith) into the same element of the system.

Figure 2B:
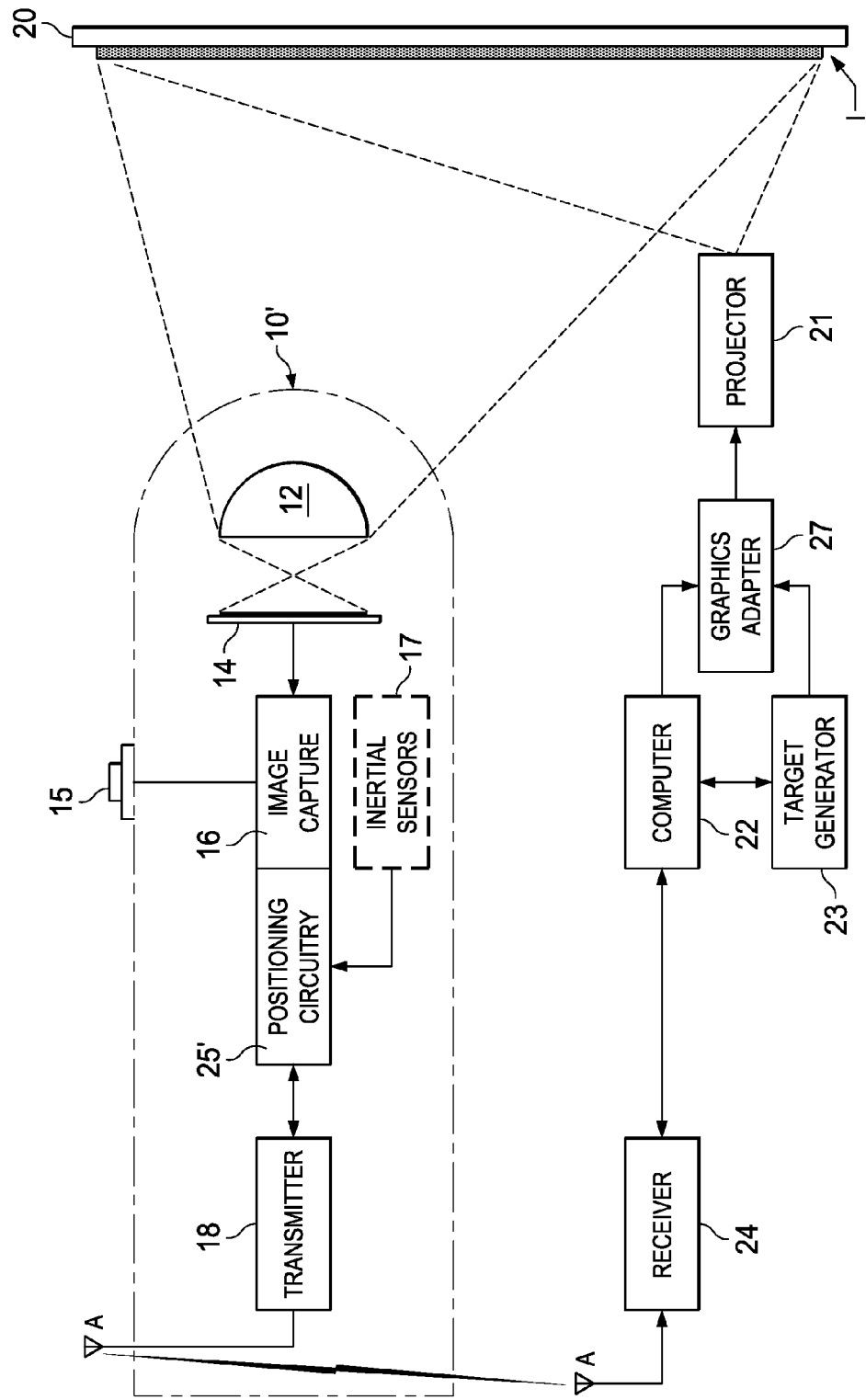

FIG. 2b illustrates an alternative generalized arrangement of an interactive display system according to embodiments of this invention. This system includes projector 21 and display 20 as in the example of FIG. 2b, with projector 21 projecting payload image content and positioning target image content generated by computer 22 as described above. In this example, pointing device 10' performs some or all of the computations involved in determining the location at display 20 at which it is currently pointing. As such, in addition to a camera (lens 12, image sensor 14, and image capture 16), positioning device 10' includes positioning circuitry 25', along with wireless transmitter 18. Conversely, computer 22 is coupled to receiver 24, as before. Alternatively, transmitter 18 and receiver 24 may be each be implemented as transceivers, capable of both receiving and transmitting wireless communications with one another, in which case data corresponding to the size, shape, and position of the positioning targets as displayed at display 20 can be transmitted to pointing device 10' for comparison.

In either case, positioning circuitry 25, 25' (hereinafter referred to generically as positioning circuitry 25) determines the location at display 20 at which pointing device 10, 10' (hereinafter referred to generically as pointing device 10) is aimed, as will be described in detail below.

The positioning described in the above-incorporated U.S. Pat. No. 8,217,997 is "absolute" positioning, in that the pointed-to location at the display is determined with reference to a particular pixel position within image. In other words, absolute positioning is determination of a particular position with reference to the reference frame of the display itself. In addition, the positioning is performed as described in U.S. Pat. No. 8,217,997, which depends on acquisition of positioning targets in two or more frames, can be done at a maximum rate corresponding to the frame rate. Other conventional absolute positioning techniques may theoretically be performed faster (depending on the image capture rate at the pointing device, the frame rate of the display, or both), but involve significant computational complexity. Indeed, the computational time required for the positioning determination described according to the approach described in U.S. Pat. No. 8,217,997 may result in a positioning rate slower than the frame rate, depending on the computational capacity of the positioning circuitry. Also, because absolute positioning may require image matching beyond a certain degree of certainty, negative results due to an imperfect match can occur in some instances, which would also extend the time between two consecutive successful position determinations. In any case, while the absolute positioning of the location at the display at which the pointing device is aimed can be quite accurate, the rate at which absolute positioning can be performed can be limited.

Figure 3A:
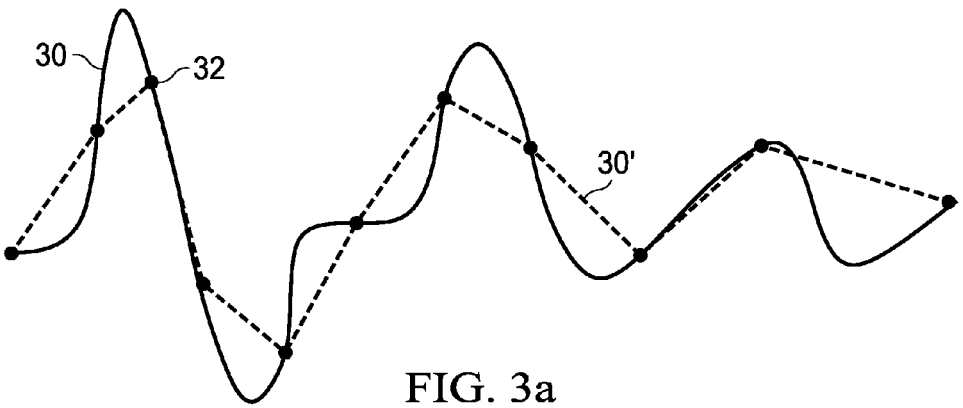
FIGS. 3a and 3b are plots illustrating estimated paths of a pointing device as determined by absolute and relative positioning, respectively, relative to the actual path of movement of the device.

This low maximum positioning rate available from conventional absolute positioning techniques can result in poor resolution in rendering the movements of the user of pointing device 10. FIG. 3a illustrates an example of this limited resolution, in which curve 30 represents the actual path of a pointing device as moved by a user, for example over a span of 160 msec. Points 32 represent the results of absolute positioning as carried out according to the approach described in U.S. Pat. No. 8,217,997, for the case in which the frame rate is 60 Hz. In that example, absolute positioning results can be produced at sample points that are 16 msec apart (at best). As such, eleven absolute positioning points 32 are generated for path 30 (including at the endpoints) over its 160 msec duration, from which estimated path 30' can be rendered. However, as is evident from FIG. 3a, path 30 includes higher frequency components (in the frequency domain sense) that cannot be accurately rendered by absolute positioning at 60 Hz. Absolute positioning provides excellent accuracy in the placement of its points 32 relative to path 30. However, the higher frequency excursions in path 30 are not faithfully reproduced in estimated path 30', as evident from FIG. 3a.

Filtering of path 30' may smooth path 30' into a more pleasing form, but of course fails to reproduce the high frequency excursions. Particularly for applications such as interactive "white boards", the discrepancy of path 30' relative to actual path 30 will often be noticeable, and in some cases may not be acceptable.

According to embodiments of this invention, pointing device 10 also includes the capability of performing "relative" positioning of its pointed-to location at display 20. Relative positioning is the determination of a particular position with reference to a previous position. In the context of the interactive systems of FIGS. 2a and 2b, relative positioning is performed based on the motion of pointing device 10 from one position to another, for example between sample times. As known in the art and as mentioned above, relative positioning can be done at a relatively high rate as its computational requirements are typically not as significant as for absolute positioning, and is not necessarily constrained by the frame rate.

Because relative positioning is based on motion sensing, motion sensing capability is implemented in one or more various ways within pointing device 10, according to embodiments of the invention. One class of motion sensors is referred to in the art as inertial sensing, by way of which physical movement of the device is directly sensed; typically, inertial sensors are deployed for each of the three axes of movement. FIGS. 2a and 2b illustrate the optional implementation of inertial sensors 17 in pointing device 10, respectively. Examples of inertial sensors 17 that may be implemented according to embodiments of this invention include accelerometers, gyroscopes, and magnetic field sensors such as magnetometers. Alternatively, or in addition to inertial sensors 17, visual motion sensing may be performed by image capture subsystem 16 in pointing device 10. Various approaches to visual motion sensing are known in the art, such as the object registration and other techniques used by conventional optical trackballs and mice, and the like.

Figure 3B:
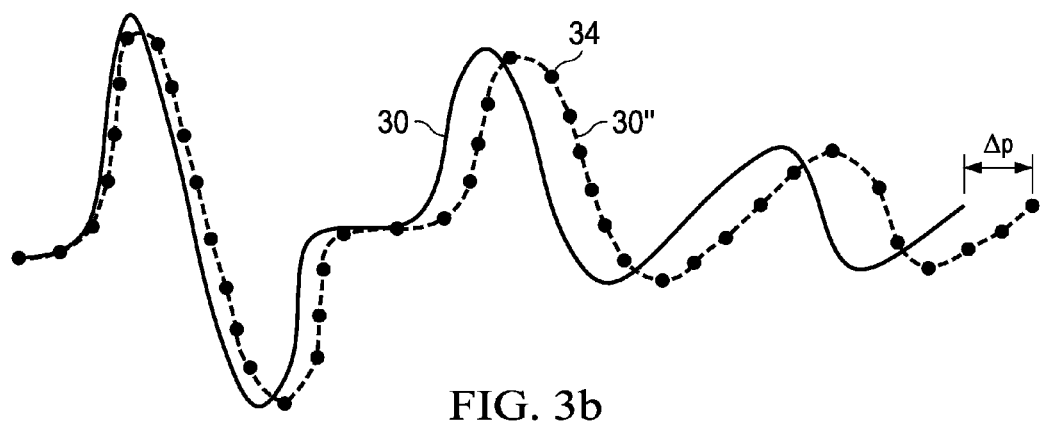

However, because the results of relative positioning are not moored to absolute locations at the display, error in relative positioning can accumulate over time. This vulnerability to error is heightened for certain types of inertial sensors, such as accelerometers, that measure acceleration of motion and therefore require two integrations in order to convert the measured acceleration to a displacement (and thus to position). FIG. 3b illustrates an example of the use of relative positioning as applied to path 30, also extending over 160 msec. In this example, relative positioning points 34 are produced at a much higher rate (e.g., about 4×) than the absolute positioning rate shown in FIG. 3a. Because of this higher positioning rate, the higher frequency components of actual path 30 are well-reproduced in estimated path 30" corresponding to relative positioning points 34. However, as evident from FIG. 3b, estimated path 30" based on relative positioning includes the effects of accumulated error over the 160 msec duration of path 30. This accumulated error amounts to a significant deviation Δp by the time that the end of path 30 is reached. It is contemplated that this accumulated error can become noticeable in many cases, especially if the user is attempting to write in cursive or draw a large figure on a display in the "white board" context. While FIG. 3b shows drift and the resultant deviation occurring in only one dimension, the drift and deviation of relative positioning results may of course have components in both the x and y dimensions.

Figure 4:
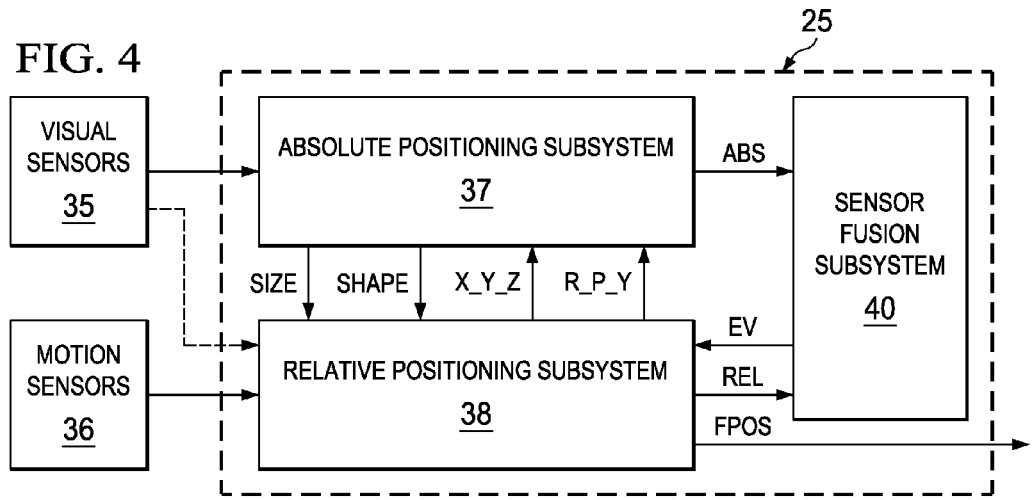
FIG. 4 is a functional diagram, in block form, illustrating the functional architecture of the positioning subsystems in an interactive display system according to embodiments of the invention.
Figure 5:
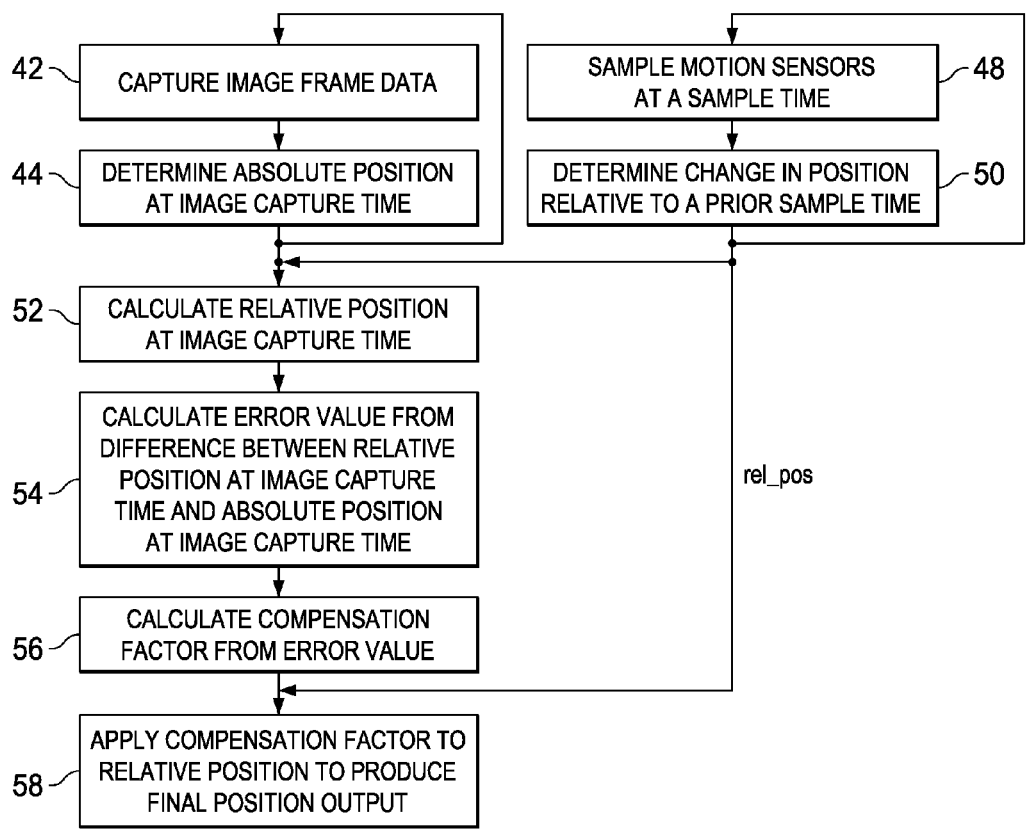
FIG. 5 is a flow diagram illustrating the operation of the architecture of FIG. 4 according to embodiments of the invention.

According to embodiments of this invention, both absolute and relative positioning are performed and their results combined in a way that improves responsiveness and accuracy of the positioning in interactive display systems such as shown in FIGS. 2a and 2b. Referring now to FIGS. 4 and 5, the functional or logical architecture of positioning circuitry 25, and its operation in carrying out positioning based on the combination of absolute and relative positioning results, according to embodiments of the invention, will now be described. As mentioned above, it is contemplated that positioning circuitry 25 may be implemented in a variety of ways, including by way of programmable logic circuitry at or connected to computer 22, within pointing device 10, or a combination thereof. In implementations in which programmable logic circuitry realizes all or part of positioning circuitry 25, it is contemplated that positioning circuitry 25 would include or access the appropriate program memory for storing the program instructions that, when executed by the programmable logic circuitry, carry out the positioning operations described below in connection with FIG. 5. These operations are performed during such time as a sequence of images are presented by computer 22 at display 20 at a frame rate suitable for the display system.

FIG. 4 illustrates visual sensors 35, which are coupled to absolute positioning subsystem 37 within positioning circuitry 25 according to this embodiment of the invention. In embodiments of this invention, visual sensors 35 correspond to image sensor 14 and image capture subsystem 16 (FIGS. 2a and 2b), which are operable to capture the positioning target image content contained within captured image I at display 20 at each image capture time (e.g., periodically according to the frame rate of display 20). In process 42 of FIG. 5, visual sensors 35 sense and capture an image of display 20 at an image capture sample time, those image data including positioning target information (human-visible or human-invisible) from which an absolute position at the image capture time is determined by absolute positioning system 37 in process 44. According to embodiments of this invention, the positioning target image content may be human-visible content, including, in some instances, the payload image data displayed at display 20. Alternatively, the positioning target image content may be "machine-visible" but human-invisible content, by way of which the pointed-to location at display 20 can be determined, without disruption of the information displayed to the audience. The use of human-invisible content for positioning is particularly useful in "white board" applications, as will be described in detail below. These image data for each image capture time are communicated to absolute positioning subsystem 37, for the determination in process 44 of the absolute pointed-to location at display 20 at which pointing device 10 was aimed at the time the image was captured.

According to those embodiments of this invention for which the positioning targets are to be human-invisible, absolute positioning subsystem 37 may be constructed and operate as described in U.S. Pat. No. 8,217,997, incorporated herein by reference. In general, according to the approach described in that U.S. Pat. No. 8,217,997, positioning targets are presented as patterned modulation of the intensity (e.g., variation in pixel intensity) in one display frame of the visual payload, followed by the same pattern but with the opposite modulation in a successive frame. Two image frames are captured by visual sensors 35 of pointing device 10. In process 44 according to this approach, absolute positioning circuitry 37 subtracts the captured image data from these two frames from one another. As a result of the subtraction, the human-visible elements in the captured images will cancel each other out as a result of the subtraction, but the complementary positioning target images will reinforce one another and become "visible", recovering the positioning target. The location, size, and orientation of the recovered positioning target identify the aiming point of pointing device 10 relative to display 20. According to the functional architecture of positioning circuitry 25 shown in FIG. 4, the absolute position pointed to by pointing device 10 is output by absolute positioning subsystem 37 via signals ABS to sensor fusion subsystem 40, along with a timestamp, preferably corresponding to the image capture time (i.e., the time at which visual sensors captured the image, and thus corresponding to the time at which pointing device 10 pointed to the location indicated by absolute position signal ABS). As mentioned above, absolute positioning subsystem 37 may alternatively produce absolute position ABS based on visible positioning targets included in the output at display 20, by way of other conventional positioning techniques and algorithms. In either case, processes 42, 44 are repeated as described above, for example at the time of the display of the next frame of image data.

Motion sensors 36 in the architecture of FIG. 4 correspond to those sensors within pointing device 10 that sense its motion, and communicate that sensed motion to relative positioning subsystem 38 for determination of a relative position of the pointed-to location at display 20. Referring to FIGS. 2a and 2b, motion sensors 36 may be implemented in the form of inertial sensors 17. Alternatively to or in combination with motion sensors 36, visual sensors 35 may also operate to detect relative motion from image data captured from display 20. In this case, the sensing of relative motion is performed by visual sensors 35 capturing and processing image data at a rate higher than the frame rate (i.e., capturing a sequence of images from the same frame at display 20). This visual sensing of relative motion is indicated, in FIG. 4, by the optional connection of visual sensors 35 to relative positioning subsystem 38. In any case, referring to FIG. 4, motion sensors 36 or visual sensors 35 (or both) operate to obtain their measurements at each of a sequence of sample times in process 48, and communicate their sensed measurements in the appropriate form to relative positioning subsystem 38, which then determines a change in position at the most recent sample time relative to a prior sample time, in process 50.

Relative positioning subsystem 38 may be realized by logic circuitry, including programmable logic circuitry executing program instructions stored in program memory within or accessible to positioning circuitry 25 that carry out the relative motion positioning of process 50, for example according to conventional algorithms for relative motion positioning, an example of which is referred to in the art as "object registration". It is contemplated that those skilled in the art having reference to this specification will be readily able to implement the program instructions or logic circuitry of relative positioning subsystem 38, in the manner best suited for a particular implementation, without undue experimentation. Upon completion of an instance of relative positioning process 50, the relative position result generated by relative positioning subsystem 38, and a corresponding timestamp indicating the sample time for that relative position result (i.e., the sample time for which the relative position is calculated) are communicated to sensor fusion subsystem 40 via signals REL. As discussed above, it is contemplated that relative positioning subsystem 38 will communicate relative position results at a higher rate than absolute positioning subsystem 37 will communicate absolute position results.

According to embodiments of the invention, sensor fusion subsystem 40 determines an error value EV corresponding to a difference between the position of display 20 at which pointing device 10 was aimed at a particular point in time as determined by absolute positioning system 37, and that position as determined by relative positioning subsystem 38 for that same point in time. According to embodiments of this invention, it is contemplated that sensor fusion subsystem 40 may be implemented as logic circuitry, including programmable logic circuitry executing program instructions stored in program memory within or accessible to positioning circuitry 25 that carry out the operations and functions for producing error value EV based on signals ABS, REL, in the manner described in detail below. It is contemplated that those skilled in the art having reference to this specification will be readily able to implement, without undue experimentation, the program instructions or logic circuitry of sensor fusion subsystem 40, in the manner best suited for a particular implementation.

As described above, it is contemplated that absolute positioning subsystem 37 will provide a more accurate position than will relative positioning subsystem 38, such that error value EV will be the distance by which the relative position at a given time differs from the absolute position at that time. However, the image capture time at which the absolute position was obtained in process 44 may not align in time with a sample time at which a relative position was obtained in process 50, particularly in the case of motion sensors 36 that typically sample at a much higher rate than visual sensors 35. This lack of synchronization between the absolute and relative positioning systems will especially be present in those implementations using inertial sensors 17 as motion sensors 36. In order to derive an accurate error value EV, it is therefore necessary to align the relative and absolute positioning results to a common point in time. Therefore, according to this embodiment of the invention, the operation of sensor fusion subsystem 40 in determining error value EV begins with process 52, in which a relative position at an image capture time is calculated, based on the relative positions at two sample times near that image capture time (e.g., one sample time before, and one after, the image capture time). This determination of the relative position at an image capture time in process 52 facilitates the calculation of error value EV in process 54.

The manner in which the alignment calculation of process 52 is to be executed by sensor fusion subsystem 40 depends on the desired approach to determining error value EV. According to embodiments of this invention, process 52 may be based on a linear temporal interpolation of the relative positions, or alternatively may be based on a velocity of the relative motion.

Figure 6A:
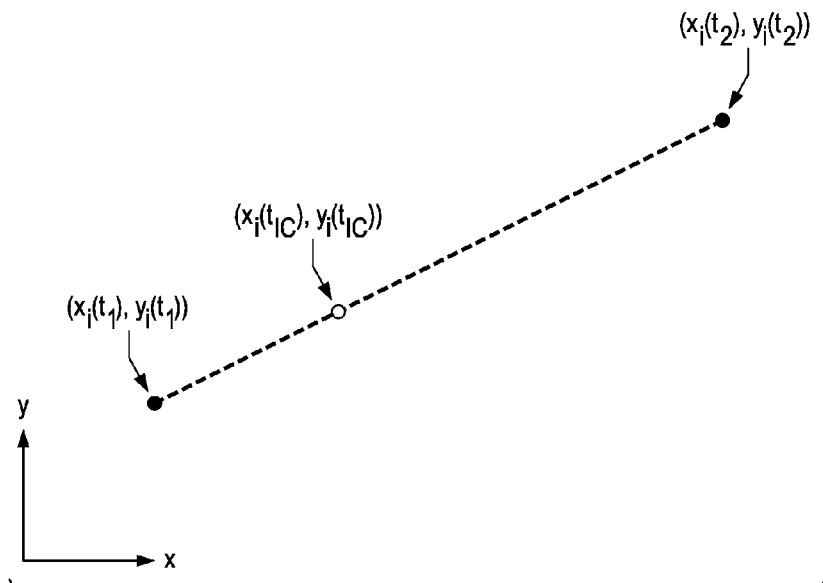
FIGS. 6a and 6b are plots illustrating the determination of a relative position at an image capture time between two relative positioning sample points.

FIG. 6a illustrates an example of the linear temporal interpolation as applied to process 52. In this example, relative positioning system 38 has identified a relative position $(x_r(t_1), y_r(t_1))$ at a sample time $t_1$, and a relative position $(x_r(t_2), y_r(t_2))$ at a sample time $t_2$. In this example, process 52 is intended to interpolate a relative position $(x_r(t_{IC}), y_r(t_{IC}))$ at image capture time $t_{IC}$ that is between sample times $t_1$, $t_2$. Linear temporal interpolation is determined, in this example, in each of the x and y directions (dimensions), according to the difference in time between image capture time $t_{IC}$ sample times $t_1$, $t_2$. In this embodiment of the invention, relative position $(x_r(t_{IC}), y_r(t_{IC}))$ is calculated by sensor fusion subsystem 40 in process 52 as:

$$x_r(t_{IC}) = \frac{x_r(t_1) \cdot (t_2 - t_{IC}) + x_r(t_2) \cdot (t_{IC} - t_1)}{t_2 - t_1}$$

$$y_r(t_{IC}) = \frac{y_r(t_1) \cdot (t_2 - t_{IC}) + y_r(t_2) \cdot (t_{IC} - t_1)}{t_2 - t_1}$$

In summary, these calculations of process 52 determine the relative position $(x_r(t_{IC}), y_r(t_{IC}))$ at image capture time $t_{IC}$ as the linear average of the two relative positions, weighted by the time differences between the image capture time and the two relative position sample times. This approach can be considered as most accurate if the time duration between relative motion sample times $t_1$, $t_2$ is short (such that the motion between those two sample times is over a short distance), or if the motion over that interval is linear and at a constant velocity.

Figure 6B:
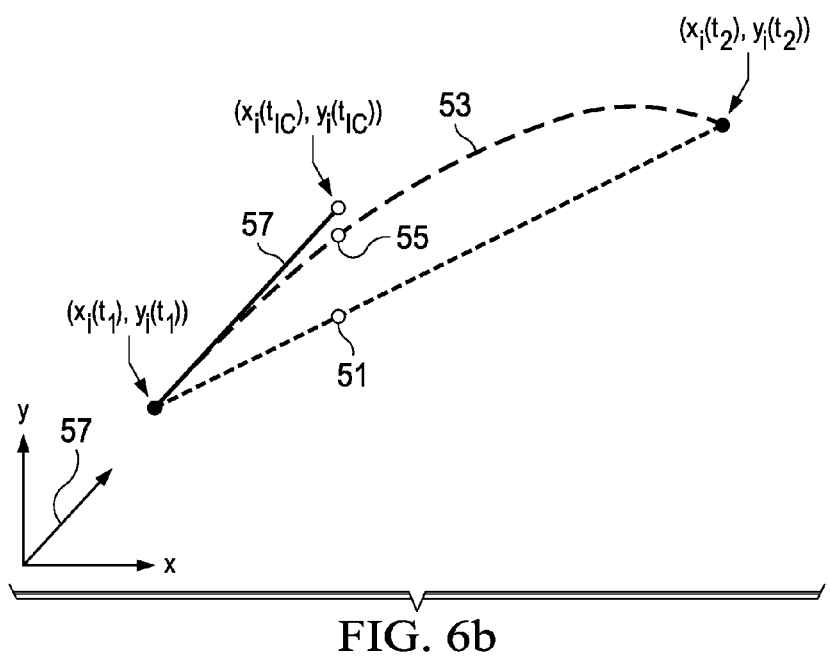

However, if the time duration is relatively long, or if the motion is neither linear nor at constant velocity, the calculation of process 52 may insert additional error into the determination of error value EV. FIG. 6b illustrates this error, for the case in which the motion between sample times $t_1$, $t_2$ is not linear, as shown by actual path 53. In this example, point 51 illustrates the estimate of the relative position at image capture time $t_{IC}$ using the linear interpolation approach described above, while point 55 illustrates the actual relative position at image capture time $t_{IC}$. As evident from FIG. 6b, significant error (in the y direction) is present as a result of the non-linear motion.

According to the velocity-based approach useful in process 52, the velocity vector at the nearer sample time to image capture time $t_{IC}$ is used to estimate a determination of the relative position $(x_r(t_{IC}), y_r(t_{IC}))$ at image capture time $t_{IC}$ based on the sensed velocity of motion. For the example of FIG. 6b, image capture time $t_{IC}$ is closer to sample time $t_1$ than to sample time $t_2$. As such, velocity vector 57 is determined in process 52, and corresponds to the velocity of motion at sample time $t_1$. According to this embodiment of the invention, it is useful for motion sensors 36 and relative positioning subsystem 38 to have calculated or otherwise determined the velocity of motion at each sample time. For example, if acceleration is measured by accelerometers of motion sensors 36, this calculation of velocity would amount to only a single integration of the measured acceleration, and would avoid the potential for additional error caused by the second integration required in calculating displacement from measured acceleration. In any case, the velocity that is of importance here is the velocity with which the pointed-to location at display 20 is moving, at display 20; as such, the velocities of interest are not necessarily the velocities at which pointing device 10 itself is moving in space. It is contemplated that those skilled in the art having reference to this specification will be able to readily implement such calculations into process 50.

Velocity vector 57 includes two velocity components $v_x(t_1)$, $v_y(t_1)$ in the x and y directions, respectively. Based on those velocity components, relative position $(x_r(t_{IC}), y_r(t_{IC}))$ at image capture time $t_{IC}$ can be readily calculated:

$$x_r(t_{IC}) = x_r(t_1) + v_x(t_1) \cdot (t_{IC} - t_1)$$

$$y_r(t_{IC}) = y_r(t_1) + v_y(t_1) \cdot (t_{IC} - t_1)$$

for the case in which image capture time $t_{IC}$ is closer to sample time $t_1$ than to sample time $t_2$. For the case in which image capture time $t_{IC}$ is closer to sample time $t_2$ than to sample time $t_1$, velocity vector 57 at sample time $t_2$, with components $v_x(t_2)$, $v_y(t_2)$, is used to perform the interpolation of relative position $(x_r(t_{IC}), y_r(t_{IC}))$ at image capture time $t_{IC}$ from:

$$x_r(t_{IC}) = x_r(t_2) + v_x(t_2) \cdot (t_2 - t_{IC})$$

$$y_r(t_{IC}) = y_r(t_2) + v_y(t_2) \cdot (t_2 - t_{IC})$$

Further in the alternative, the velocity vector 57 may be determined from an average of the velocity vectors at sample times $t_1$ and $t_2$; this average velocity may be weighted, if desired, based on the proximity of the image capture time $t_{IC}$ to one or the other of those sample times $t_1$, $t_2$.

Referring back to FIG. 5, once the relative position $(x_r(t_{IC}), y_r(t_{IC}))$ at image capture time $t_{IC}$ is calculated in process 52, sensor fusion subsystem 40 then executes process 54 to determine error value EV by comparing this relative position $(x_r(t_{IC}), y_r(t_{IC}))$ with the absolute position $(x_a(t_{IC}), y_a(t_{IC}))$ at that same time, as determined in process 44. It is contemplated that this error value will be reflected in the two dimensions of the x and y directions:

$$EV_x(t_{IC}) = x_a(t_{IC}) - x_r(t_{IC})$$

$$EV_y(t_{IC}) = y_a(t_{IC}) - y_r(t_{IC})$$

Error value EV components are considered as signed values. Referring to the architecture of FIG. 4, this error value EV is communicated from sensor fusion subsystem 40 back to relative positioning subsystem 38, for compensation of past, current, and future relative positions based on the measurements by motion sensors.

According to embodiments of this invention, the results of relative positioning process 50 are compensated by a compensation factor corresponding to the error value EV determined in process 54. In the example of FIG. 5, process 56 is performed by relative positioning subsystem 38 (or, alternatively, by sensor fusion subsystem 40) to derive this compensation factor. A simple approach to process 56 is to assume that the absolute position produced in process 44 is exactly accurate, and that error value EV corresponds to accumulated drift of relative position results since a previous error value determination. In this simple approach, the compensation factor is trivially determined in process 56 to be identical to error value EV. In process 58 for this simple example, relative positioning subsystem 38 additively (the components of error value EV being signed values) applies the compensation factor to one or more relative position results $(x_i(t_k), y_i(t_k))$ in process 58:

$$x_r(t_k) \leftarrow x_r(t_k) + EV_x(t_{IC})$$

$$y_r(t_k) \leftarrow y_r(t_k) + EV_y(t_{IC})$$

where ← is the replacement operator, and where $EV_x(t_{IC})$, $EV_y(t_{IC})$ are the error value components at the most recent image capture time.

It has been observed, in connection with this invention, that the absolute positions determined by absolute positioning subsystem 37 may not be precisely accurate each time that it is calculated. In that case, the simple applying of error value EV as the compensation factor could mis-compensate the relative positions. In addition, even if the absolute position results are precisely accurate, sudden application of a large compensation to relative position results may be disconcerting to the user and the audience. Accordingly, it may be preferable in some cases to calculate the compensation factor in process 56 using a weighting factor w:

$$x_r(t_k) \leftarrow x_r(t_k) + EV_x(t_{IC}) \cdot w$$

$$y_r(t_k) \leftarrow y_r(t_k) + EV_y(t_{IC}) \cdot w$$

where w is a constant from 0 to 1. In this approach, a low weighting factor w will apply only a small amount of compensation, while a higher weighting factor w will apply stronger compensation.

Figure 6C:
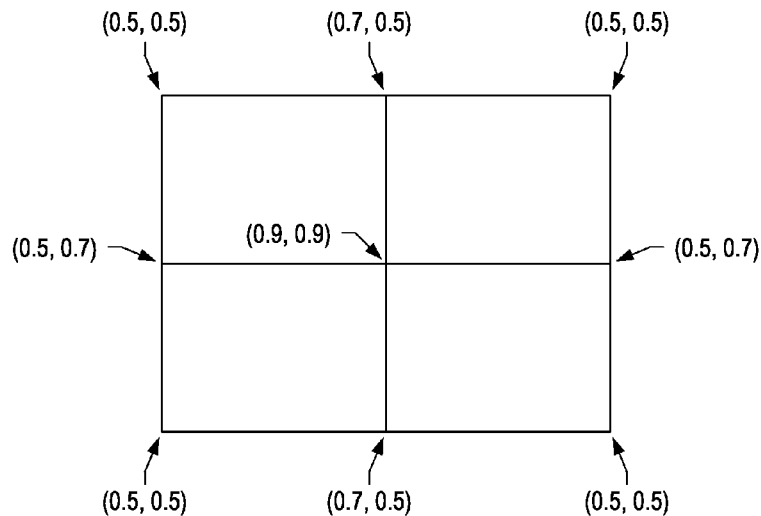
FIG. 6c is an illustration of the dependence of compensation weighting factors according to the location of the absolute position within an image frame.

According to embodiments of this invention, weighting factor w in the calculation of the compensation factor may depend on particular conditions or other factors. For example, the accuracy of the absolute positions determined by absolute positioning subsystem 37 may vary according to the location of the positioning target within the captured image. In this case, weighting factor w may be a function of the proximity of the positioning target to the center point of the image area, evaluated in each instance of compensation factor calculation process 56. In addition, or alternatively, the x and y directions may receive different weighting factors $w_x$, $w_y$, for example if the captured image area is not square. FIG. 6c illustrates an example of the weighting factors $w_x$, $w_y$ arranged by position of the positioning target within the image capture area. As discussed above, the amount of applied compensation increases with increasing weighting factor w, so that the compensation is lower for instances in which the location of the positioning target is nearer the edges or corners of the image capture area, and higher as the location of the positioning target is nearer the center of the image capture area.

Non-linear weighting factors may also be used to determine the compensation factor applied to the relative positioning results. For example, the weighting factor may be calculated in a manner that depends on the magnitude of error value EV. A simple approach to this non-linear weighting would be to calculate weighting factors $x_x$, $w_y$, to be directly proportional to the magnitude of error value components $EV_x$, $EV_y$, respectively.

Further in the alternative, the calculation of the compensation factor in process 56 may not use a weighting factor. The compensation factor may simply be a fixed step (e.g., a fixed number of pixels), a step size that increments or decrements according to the polarity of error value EV (e.g., two pixels for a first instance of error in a particular direction, four pixels after a second instance of error in that direction, etc.), or a thresholded compensation (i.e., no compensation if error value EV is below a certain threshold), and the like. Other compensation methods such as used in ADPCM modulation, Kalman filtering, and the like may alternatively be applied.

Referring back to FIG. 4, upon the desired compensation being applied to a relative position determination in process 58, the compensated positioning result is communicated to computer 22 via signals FPOS. According to embodiments of the invention, signals FPOS present the locations at display 20 pointed to by pointing device 10 at a relatively high sample rate, such as available from conventional relative positioning systems, but at an accuracy similar to that available from conventional absolute positioning systems. The processes continue to be repeated for additional sampling and positioning measurement over time.

Figure 3C:
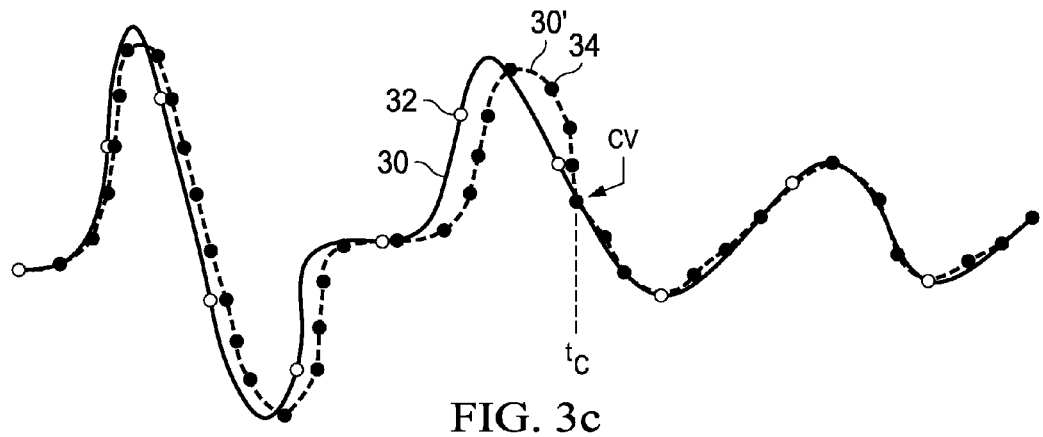
FIG. 3c is a plot illustrating an estimated path of a pointing device as determined by an embodiment of the invention.

FIG. 3c illustrates an example of the compensation derived according to the architecture and method of FIGS. 4 and 5, according to an embodiment of the invention. Actual path 30 of the pointed-to location by pointing device 10 is illustrated in FIG. 3c, with absolute position points 32 indicated by the open circles. As evident from FIG. 3c, absolute position points 32 are quite accurate relative to actual path 30. However, relative position points 34 involve accumulating drift in the x direction, such that path 30' indicated by these relative position points 34 begins to deviate significantly from actual path 30. At point CV, however, the operation of the architecture and method of FIGS. 4 and 5 applies a compensation factor sufficient to place the relative position point 34 at that point (at time $t_C$) onto actual path 30. Relative position points 34 after time $t_C$ are compensated by that same or an updated compensation factor, such that estimated path 30' closely matches actual path 30. After the compensation factor derived according to embodiments of this invention have been applied at time $t_C$, the compensated relative position points 34 are provided at a sufficiently high sample rate to accurately render the higher frequency features of actual path 30, as shown in FIG. 3c.

According to current-day technology, the computations involved in absolute positioning process 44 may consume significant time relative to the frame rate of display 20. For example, absolute positioning according to the human-invisible positioning method of the above-incorporated U.S. Pat. No. 8,217,997 requires the analysis of the two most recent captured images in order to recover the positioning target. As such, it is possible in some situations that the error value EV that is obtained can be rather "stale", such that recent increases in the error (e.g., accumulating drift) that have occurred since the absolute position was determined that the compensation factor does not fully compensate the differences between absolute and relative positioning.

This issue may be addressed by testing the time at which the computations of absolute positioning in process 44 complete relative to one of the image capture times. For example, in the method according to U.S. Pat. No. 8,217,997, the time at which process 44 completes can be compared against a selected delay time after the image capture time of the second of the two frames involved. If process 44 completes prior to that threshold time, then the absolute position value so determined is relatively "fresh", and that absolute position is communicated to sensor fusion subsystem 40 for processes 52 through 58. On the other hand, if process 44 does not complete until after that threshold time has passed, the absolute position value is considered as "stale" and that result is not forwarded to sensor fusion subsystem 40 for process 52. In that case, absolute positioning process 44 is immediately repeated after the next image capture time, and that new result is then used for determining the error value EV via processes 52 et seq.

According to the embodiment of the invention described above, compensation of the relative position results can be considered as "static" calibration of the relative positioning, in that the compensation factor is derived after an error has already occurred (e.g., as shown in FIG. 3c prior to time $t_C$). More specifically, the static nature of this calibration results from the manner in which relative positioning subsystem 38 determines a relative position based on detected motion of pointing device 10 between sample times.

Conventional motion sensors, particularly inertial sensors, and corresponding relative positioning systems typically calculate position in terms of standardized distance measurements (e.g., mm or cm at display 20), rather than as pixels. Transformation of these distances into pixels requires application of a transformation multiplier $T_x$ as follows:

$$x_r^p(t_k) - x_r^p(t_{k-1}) = T_x[x_r^d(t_k) - x_r^d(t_{k-1})]$$

$$y_r^p(t_k) - y_r^p(t_{k-1}) = T_y[y_r^d(t_k) - y_r^d(t_{k-1})]$$

where $x_r^p$ is a relative position expressed in pixels, $x_r^d$ is a relative position expressed in distance, and $T_x$ is the transformation multiplier (i.e., the pixel pitch). In the context of "static" calibration described above, the transformation multipliers $T_x$, $T_y$ are constants, and are applied as appropriate in the determination of the change in relative position in process 50.

Figure 7:
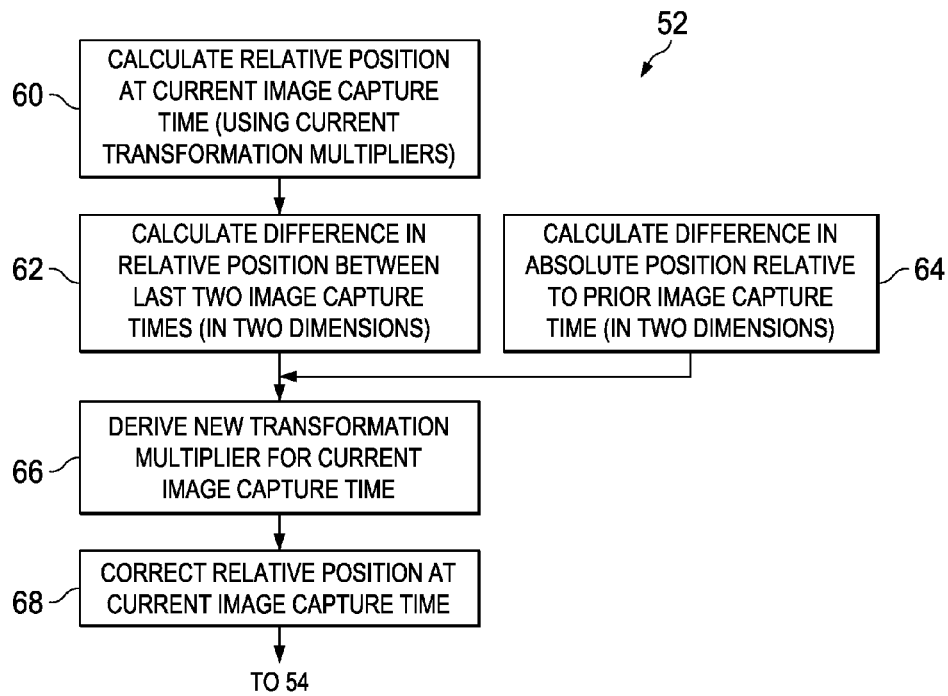
FIG. 7 is a flow diagram illustrating the operation of a dynamic calibration method according to an embodiment of the invention.

It has been observed, however, that transformation multipliers $T_x$, $T_y$ may not necessarily remain constant in some situations. First, because pointing device 10 is not necessarily in physical contact with display 20, different linear physical movements of pointing device 10 may be translated into different pixel-based movements, specifically in connection with movements of pointing device 10 to different distances from, or different angles to, display 20, such movements resulting in different perspectives. Secondly, the accuracy of the translation of inertial sensor results into physical measurements may not be adequate, considering that the two integrations required to convert acceleration into displacement may change over time. Accordingly, it may not always be valid to assume that transformation multipliers $T_x$, $T_y$ will remain constant. According to another embodiment of the invention, a "dynamic" calibration of the calculated relative positions is implemented by modification of transformation multipliers $T_x$, $T_y$ over time, for example at each time that an absolute position is determined in process 44. In this way, as will now be described in connection with FIG. 7, the compensation factors used to correct relative position results will be determined prior to such time as relative-to-absolute position error occurs, rather than after the fact as in the case of "static" calibration, for example within process 52 in which the relative position at a current image capture time is calculated.

Process 52 according to this embodiment of the invention is carried out in response to the calculation of a new absolute position by process 44, and as such is an iterative process over time as performed during the operation of the interactive display system of FIGS. 2a and 2b. In process 60 of FIG. 7, the relative position at the current image capture time (i.e., that corresponds to the new absolute position) is calculated, using values of transformation multipliers $T_x$, $T_y$, for example as determined in a previous instance of this process. In process 62, a difference in the relative position between that calculated in process 60 for the current image capture time $t_k$ and a previous image capture time $t_{k-1}$ is determined (in both the x and y directions):

$$x_r^p(t_{k+1}) - x_r^p(t_k) = T_x(t_{k-1})[x_r^d(t_{k+1}) - x_r^d(t_k)]$$

$$y_r^p(t_{k+1}) - y_r^p(t_k) = T_y(t_{k-1})[y_r^d(t_{k+1}) - y_r^d(t_k)]$$

where transformation multipliers $T_x(t_{k-1})$, $T_y(t_{k-1})$ are the transformation multipliers as determined from the prior image capture time $t_{k-1}$. In process 64, the change in absolute position as determined in process 44 for the current and previous image capture times $t_k$, $t_{k-1}$ is calculated, again in both the x and y directions. The results of processes 62, 64 are then applied to the derivation of new transformation multipliers $T_x(t_k)$, $T_y(t_k)$ for the current image capture time:

$$T_x(t_k) = T_x(t_{k-1}) \times \frac{x_a(t_k) - x_a(t_{k-1})}{x_r^p(t_k) - x_r^p(t_{k-1})}$$

$$T_y(t_k) = T_y(t_{k-1}) \times \frac{y_a(t_k) - y_a(t_{k-1})}{y_r^p(t_k) - y_r^p(t_{k-1})}$$

where $x_v(t_k)$ and $y_v(t_k)$ are the absolute positions in the x and y direction, respectively, at the current image time $t_k$. The prior relative positions $x_r(t_{k-1})$ and $y_r(t_{k-1})$ at image capture time $t_{k-1}$ may either correspond to corrected relative positions, or may instead be the uncorrected relative positions.

According to this approach, if the distance of motion calculated from the measurements by inertial sensors 36 is greater than that indicated by the absolute positions at the same points in time, then the transformation multipliers $T_x$, $T_y$ will be decreased in process 66. Conversely, if the motion indicated by the absolute positions is greater than the relative positions as sensed and calculated, the transformation multipliers $T_x$, $T_y$ will be increased by process 66.

This change in the transformation multipliers will be applied to the relative position calculated for the current image capture time, in process 68. To the extent that transformation multipliers $T_x$, $T_y$ changed in the most recent instance of process 66, the relative position calculated in process 60 will be adjusted in process 68. This corrected relative position result will then be forwarded to process 54 (FIG. 5) for determination of error value EV as described above.

It is contemplated that changes in transformation multipliers $T_x$, $T_y$ may be sufficiently large that the visible result at display 20 would be noticeable and disconcerting, if applied as a step correction. According to an alternative implementation of this dynamic calibration approach, weighting factors $w_{Tx}$, $w_{Ty}$ may be included in the calculation of transformation multipliers $T_x$, $T_y$ in process 66:

$$T_x(t_k) = T_x(t_{k-1}) \times \left[ \frac{x_a(t_k) - x_a(t_{k-1})}{x_r^p(t_k) - x_r^p(t_{k-1})} \times w_{Tx} + (1 - w_{Tx}) \right]$$

$$T_y(t_k) = T_y(t_{k-1}) \times \left[ \frac{y_a(t_k) - y_a(t_{k-1})}{y_r^p(t_k) - y_r^p(t_{k-1})} \times w_{Ty} + (1 - w_{Ty}) \right]$$

The weighting factors $w_{Tx}$, $w_{Ty}$ may vary from a low level of 0 that indicates a low confidence in the absolute positioning (for which no change in the transformation multipliers will be made) to a high level of 1 that indicates a high confidence in the absolute positioning (and for which maximum change in the transformation multipliers will be applied). The weighting factors $w_{Tx}$, $w_{Ty}$ in the two dimensions may differ from one another if desired.

As described above, the new transformation multipliers $T_x$, $T_y$ are then applied to the relative position at the current image capture time $t_k$ and to relative position values generated by relative positioning subsystem 38 until the next update of those transformation multipliers, for example on receipt of the next absolute position value (from process 44).

Other alternatives and variations to the above-described process are also contemplated in connection with this invention. One such variation includes analysis of the absolute positions determined from visual sensors 35. It has been observed, in connection with this invention, that errors in the absolute position result can arise due to a number of factors. In the event that a significant error is present in an absolute position determination, the error would be compounded if relative positions were "corrected" to conform to that erroneous absolute position result. For example, if the change in absolute positions indicated that pointing device 10 moved by a distance of 60 pixels up and 20 pixels to the right, while the change in relative positions over that time interval indicated movement of 12 pixels up and 3 pixels to the left, the compensation factor derived from this significant error between the two detection modes could result in significant error in the resulting displayed result, especially in a "white board" application. A similar error may occur from erroneous corrections in the generation of the transformation multipliers in process 66, and that are applied to the calculation of new positions.

According to a variation on the process described above, significant errors in the absolute position values generated in process 44 are detected by comparing the error value EV against a threshold value. The threshold value may be a static value, for example a change of more than ±30% of the prior error value EV. Alternatively, the threshold value may be dynamically adjusted during operation, for example based on a statistic of the error values EV over a number of most recent samples. In the event of the error value EV exceeding the threshold value, the absolute position giving rise to that significant change in error value EV may be discarded, and that error value not used in the setting or updating of the compensation factor in process 56 or in the calculating of new transformation multipliers in process 66. A variation on this thresholding process would be to analyze the behavior of the relative position values to determine whether the most recent relative positions appeared to be inconsistent with previous positions, before assuming that an erroneous absolute position caused the unexpectedly large error value EV. Other variations on this thresholding approach will be apparent to those skilled in the art having reference to this specification.

As discussed above and as shown in the example of FIG. 3c, embodiments of this invention provide the capability of compensating, in real time, relative position values as they are generated at a relatively high sample rate, thus tracking the movement of the location pointed to by a remote pointing device in an interactive display system. However, embodiments of this invention can be used to make other types of correction in positioning in such an interactive system.

One variation in this regard provides the ability to insert "virtual" relative position points along the estimated path followed by the pointed-to location at the display. While the relative positioning sample rate is significantly higher than the absolute positioning rate (which may be constrained to the sample rate), it may be useful in some situations to improve the apparent positioning rate even further ("smoothing"). Examples of these situations can arise when the speed of motion (e.g., the speed of the user's "hand-writing" using pointing device 10) is high, such that the time and distance between relative positions is long, resulting in a choppy piece-wise linear representation of the path. According to an embodiment of the invention, "virtual" relative positions can be interpolated between actual relative position values in much the same way as the relative position is calculated in process 52 (FIG. 5). As described above, the relative position at one or more of these "virtual" sample times between actual relative positions can be derived by way of a linear temporal interpolation, or alternatively based on a sensed velocity vector at either of the relative motion sample times (or an average of the two).

Similarly, according to another embodiment of the invention, predictive "virtual" relative positions are predicted for points that are in advance of the current pointed-to location (i.e., in advance of the most recent relative positions). In this embodiment of the invention, the velocity vector at the most recent relative position sample point, or recent changes in the magnitude or direction of the velocity vector, can be used to extrapolate a virtual relative position prior to such time as motion sensors 36 and relative positioning subsystem 38 operate to produce that relative position value. The virtual relative position may be replaced or adjusted upon determination of the true corrected relative position at that time, or later. However, the predictive relative positioning can have the effect of improving the natural feeling of "writing" with pointing device 10 in a "white board" context, as the predicted positions can eliminate the perceived time lag between the movement of pointing device 10 and the rendering of the drawn line.

According to another embodiment of the invention, it is contemplated that the compensation factors derived according to embodiments of the invention can also be used to back-correct prior relative positions of pointing device 10. This back-correction can be incorporated by storing a given number of relative positions in memory, for example the positions at all sample times since the last absolute position image capture time, and then correcting those stored relative positions based on the new compensation factor determined in the most recent instance of process 56. If a line or path were drawn on display 20 based on those relative positions, the correction of the previous relative positions could also be used in the redrawing of that path, if desired. Again, it is useful for that correction to be done subtly, rather than in a drastic or sudden manner that could raise attention to the correction. The compensation factors can be applied "in whole" (i.e., the same compensation factors are used to correct all previous positions), or in a graduated manner by way of which the applied compensation factors increase from zero with the distance (or time interval) away from a reference location at which the position is deemed accurate.

As mentioned above relative to FIG. 4, signals may be exchanged between absolute positioning system 37 and relative positioning subsystem 38 by way of which information from each of those systems can assist in the positioning task carried out by the other. According to some embodiments of the invention, absolute positioning system 37 operates by analyzing a captured image from part or all of display 20, to identify positioning target patterns located therein; visible elements may also be identified from these captured image data. As mentioned above, these image capture times continue periodically throughout operation, for example at a rate on the order of the frame rate of display 20. In this embodiment of the invention, absolute positioning system 37 is capable of recognizing elements within the captured image data, and of comparing those elements from one image capture time to the next. The data corresponding to these elements can be used to assist in the relative positioning process.

Figure 8:
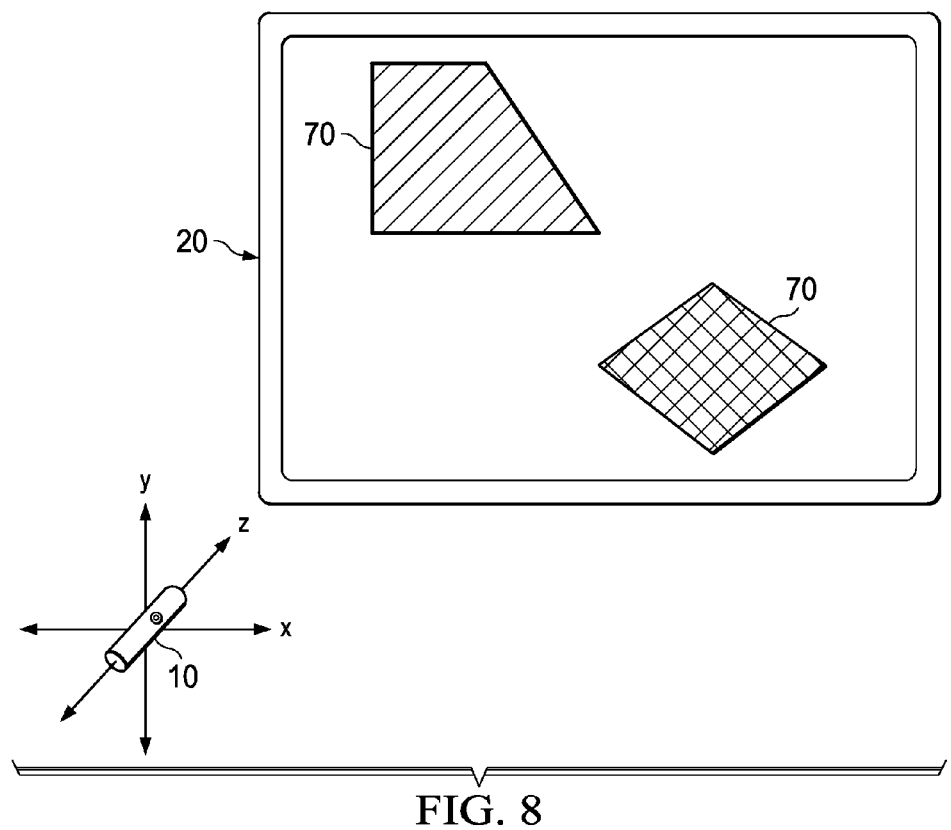
FIG. 8 is a perspective view of the orientation axes of a pointing device as used in the cooperation between absolute and relative positioning according to an embodiment of the invention.

Referring to FIG. 8, pointing device 10 is viewing display 20, which is displaying elements 70, which are either human-visible or human-invisible. If pointing device 10 is moved toward or away from display 20 (i.e., along the z axis that is normal to the plane of display 20) during the time between image capture times, elements 70 in the captured image data will show a change in size, which can be detected by absolute positioning subsystem 37. According to an embodiment of the invention, absolute positioning subsystem 37 communicates signals SIZE, SHAPE directly to relative positioning subsystem 38. Signals SIZE and SHAPE indicate changes in size and shape, respectively, of the positioning target or another displayed element over the relative time interval. These indications of changes in size and shape can assist the determination of distance and angle, respectively, of pointing device 10 in the relative motion positioning carried out by subsystem 38. This assistance can be in the nature of a confirmation of the sensed relative motion, or alternatively to speed up the relative positioning calculations by narrowing the necessary analysis to be performed by relative positioning subsystem 38.

Conversely, motion sensed and analyzed by relative positioning subsystem 38 can be of use to the calculations performed by absolute positioning subsystem 37. As shown in FIG. 4, relative positioning subsystem 38 communicates signals R_P_Y and X_Y_Z to absolute positioning subsystem 37. Signals R_P_Y are indicative of roll, pitch, and yaw movement of pointing device 10, which are directly detectable by inertial sensors 36 as analyzed by relative positioning subsystem 38. In the context of FIG. 8, roll refers to rotation of pointing device 10 about the z axis, i.e. the axis normal to display 20. The z axis is the longitudinal axis of pointing device 10 when it is pointed directly at display 20 in the manner shown in FIG. 8. Pitch refers to rotation of pointing device 10 about the x axis, which is the horizontal axis parallel to the plane of display 20 in this example. Similarly, yaw refers to rotation of pointing device 10 about the y axis, which is the vertical axis parallel to the plane of display 20 in this example. In general, pointing device 10 will be in an attitude in which each of roll, pitch, and yaw are non-zero. Signals X_Y_Z, on the other hand, are indicative of linear motion along the x, y, and z axes, respectively. Changes in roll, pitch, and yaw, and linear motion along each of the three axes, can be helpful in the absolute positioning calculations, as the attitude of pointing device 10 is indicative of the location at display 20 at which it is pointing. According to this embodiment of the invention, signals $R_{13}$ P_Y and X_Y_Z are communicated directly from relative positioning subsystem 38 to absolute positioning subsystem 37, to assist in its calculations.

Knowledge of the roll, pitch, and yaw angles allow absolute positioning subsystem 37 to correct the captured image until it appears as if the camera in pointing device 10 is looking at the image with zero yaw, pitch, and roll. This correction will simplify the target detection process because the positioning targets in the captured images will more closely match one another. For example, if the roll angle is 30 degrees clockwise, the second captured image would appear on image sensor 14 at a 30 degree counterclockwise angle relative to the first captured image. In order to simplify target detection in this case, absolute positioning subsystem 37 would first rotate the captured image for the second frame 30 degrees clockwise, causing the elements within the image to be at zero relative roll relative to the first captured image, and would then only look for matching images that are at no relative roll. Linear motion detected by inertial sensors 17 can also help the absolute positioning process by providing a direction in which absolute positioning subsystem 37 can look for objects in the second captured image that were identified from a prior frame.

As mentioned above, the relative motion of pointing device 10 may be detected through the use of visual relative motion sensing. In this approach, captured image data is analyzed to determine the movement of elements in the displayed images, from which relative positioning subsystem 38 can deduce a new position of the pointed-to location relative to a previous location. For example, if pointing device 10 in FIG. 8 moves its pointed-to location toward the upper left-hand corner of display 20, elements 70 will appear to move down and to the right in the captured image data, relative to a previously captured image. The new pointed-to location can be determined from this detected relative motion, for example by way of known algorithms such as object registering.

This visual relative motion sensing requires "texture" in the images displayed at display 20 that can be used to deduce this relative motion. This visible texture can of course be constituted by human-visible content, such as text, graphics, physical attributes of display 20, objects outside of display 20, and the like. However, as mentioned above, interactive display systems according to embodiments of this invention are also intended for use in "white board" applications, in which the user can write or draw on an otherwise blank display 20. No visible "context" may be present on a blank display screen, but accurate positioning of the location at display 20 at which pointing device 10 is aimed is still required.

Figure 9A:
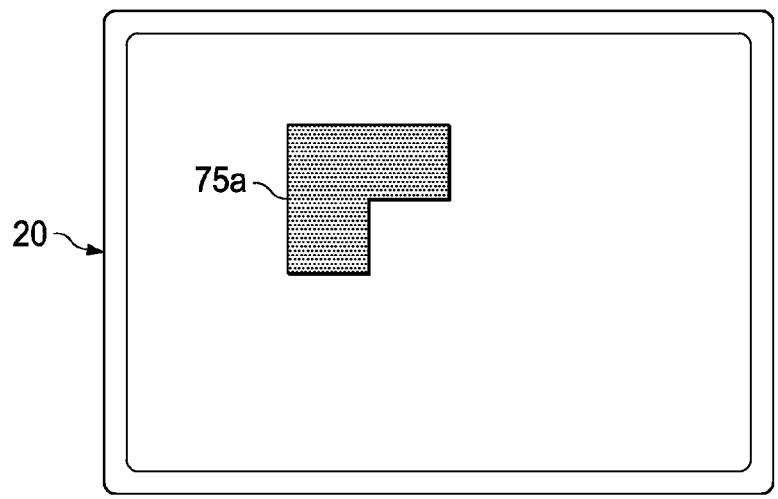
FIGS. 9a through 9c are views of a display illustrating the operation of a visual relative positioning method according to an embodiment of the invention.
Figure 9B:
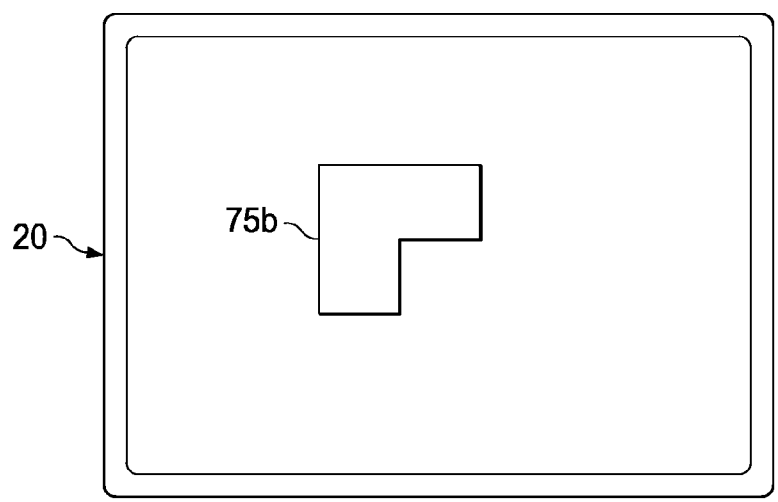

The positioning approach described in the above-incorporated U.S. Pat. No. 8,217,997 enables the accurate positioning of the pointed-to location in a "white board" application, through its use of human-invisible positioning targets in the form of complementary modulation of the target pattern in consecutive display frames. FIGS. 9a and 9b illustrate consecutive frames of displayed data according to this positioning approach. For example, target pattern 75a shown in FIG. 9a is in the form of a darker modulation of the background pattern in a given location at display 20 in a first frame. Target pattern 75b shown in FIG. 9b illustrates the same positioning target in the next successive frame, in the form of a brighter modulation of the background pattern. According to the absolute positioning method of the above-incorporated U.S. Pat. No. 8,217,997, subtraction of the image frame data from these two frames will cancel out the background image data, but reinforce the differential modulation, highlighting those pixels of display 20 that are in both target patterns 75a, 75b.

As evident from a comparison of FIGS. 9a, 9b, however, target pattern 75b is in a different position (lower and to the right) as compared with target pattern 75a, due to movement of pointing device 10 (in this example, toward the upper left-hand corner) during the time interval between the two image capture times. Accurate detection of the relative motion of target pattern 75b relative to target pattern 75a would provide a relative position of pointing device 10 at the later time. Conventional visual relative motion algorithms are capable of rapidly performing such analysis of movement in visible image data features, typically by looking for corners and other features of the displayed elements. In the context of FIGS. 9a and 9b, however, the complementary modulation of positioning targets 75a, 75b would not be recognized as the same element by conventional visual relative positioning algorithms. As such, relative positioning subsystem 38 would not detect relative motion from the captured images of FIGS. 9a and 9b.

Figure 9C:
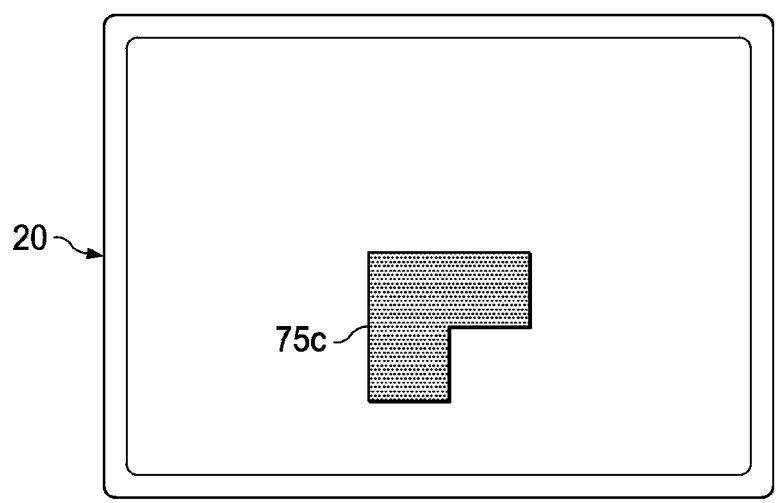

According to this embodiment of the invention, visual relative positioning is performed by skipping captured image data frames. FIG. 9c illustrates display 20 for a third frame that is the next successive frame following the frame of FIG. 9b. According to the approach of the above-incorporated U.S. Pat. No. 8,217,997, target pattern 75c will again be a darker modulation of the background pattern of display 20, as evident from FIG. 9c. Application of the conventional visual relative positioning algorithm to the alternate (first and third) frames of FIGS. 9a and 9c would result in detection of relative motion, due to the same feature (target patterns 75a, 75c) appearing in both captured images. Relative positioning subsystem 38 executing such an algorithm would readily detect the upward-left movement of pointing device 10 between those alternate frames.

As a result of the relative positioning approach according to this embodiment of the invention, however, the frequency of relative motion calculation would be reduced by one-half (to a rate of one-half the frame rate). To improve that relative positioning rate, the visual relative positioning algorithm can be applied by relative positioning subsystem 38 to the second frame (i.e., that of FIG. 9b) and then the fourth frame immediately after the third frame of FIG. 9c. These two frames would both include a brighter modulation of the background at the locations of the positioning targets, and would be recognized as the same pattern by the relative motion algorithm. Accordingly, another estimate of relative motion could be determined in the next frame (i.e., the fourth frame) immediately following the third frame of FIG. 9c. The relative positioning could thus operate at the frame rate of display 20.

In addition, according to this embodiment of the invention, relative motion can be estimated for the skipped frame between the two frames (e.g., frames of FIGS. 9a and 9c) used in the visual relative positioning. This estimate can be based on the assumption that the velocity and direction of motion is consistent between the two analyzed frames. For example, if the velocity and direction of movement of pointing device 10 between the first and third frames is assumed to be constant, then the relative movement $\Delta x_{2-3}$, $\Delta y_{2-3}$ between the second and third frames can be estimated as one-half the movement $\Delta x_{1-3}$, $\Delta y_{1-3}$ between the first and third frames.

$$\Delta x_{2-3} = \frac{\Delta x_{1-3}}{2}$$

$$\Delta y_{2-3} = \frac{\Delta y_{1-3}}{2}$$

Similarly, if the velocity and direction of movement between the second and fourth frames is assumed constant, then the relative movement between the third and fourth frames can be estimated as one-half that between the second and fourth frames.

Other approaches to calculating the relative motion based on visual detection of positioning targets in alternate frames are also contemplated. For example, if a velocity vector is calculated at the time of the second frame, the relative motion at the time of the third, intermediate, frame can be estimated by applying that velocity vector over the time interval between the image capture time during the second frame and the image capture time during third frame. Conversely, the relative motion at the time of the third frame can be estimated by applying a velocity vector calculated for the image capture time during the fourth frame, and interpolating back in time to the image capture time during the third frame. Further in the alternative, an average of the two velocity vectors for the second and fourth frames can be used to interpolate the relative position at the time of the third, intermediate frame. Other variations for estimating these relative positions are also contemplated. In any case, these estimates allow the visual relative motion subsystem to provide positioning information every frame, even though those estimates are based on motion between two alternate frames.

According to embodiments of this invention, therefore, both accurate and also rapid positioning of the location at a graphics display at which a remote pointing device is aimed is accomplished. This excellent positioning can be carried out over a range of distances between the pointing device and the display, and in a manner that is suitable for use in a wide range of applications, including the "low texture" application of an electronic "white board". Embodiments of this invention also enable predictive and also back-corrective correction of positioning results, as is particularly useful in these "white board" applications.

While this invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of operating a computer system including a handheld human interface device, comprising:
   displaying image frame data on a display;
   capturing, at a handheld human interface device, image data representative of at least a portion of the display;
   determining an absolute location at the display at which the device is pointing at an image capture time;
   evaluating motion of the handheld device based on measurements acquired from one or more sensors in the device;
   for each of a plurality of sample times including a first sample time earlier in time than the image capture time and a second sample time later in time than the image capture time, determining a relative location at the display at which the device is pointing based on the evaluated motion of the device relative to a prior sample time;
   calculating, from the relative locations determined at the first and second sample times, a calculated relative location at the image capture time;
   determining an error value between the absolute location at the image capture time and the calculated relative location; and
   then adjusting one or more relative locations by a compensation value corresponding to the error value.

2. The method of claim 1, wherein the error value comprises error value components in each of first and second orthogonal directions;
   and wherein the step of determining the error value comprises:
      calculating the relative position at the image capture time in the first direction as a ratio of the relative position in the first direction at the first sample time multiplied by the difference between the second sample time and the image capture time, plus the relative position in the first direction at the second sample time multiplied by the difference between the image capture time and the first sample time, to the difference between the first and second sample times;
      calculating the relative position at the image capture time in the second direction as a ratio of the relative position in the second direction at the first sample time multiplied by the difference between the second sample time and the image capture time, plus the relative position at the second sample time in the second direction multiplied by the difference between the image capture time and the first sample time, to the difference between the first and second sample times;
      determining the error value in the first direction as the difference between the calculated relative position in the first direction and the absolute position in the first direction at the image capture time; and
      determining the error value in the second direction as the difference between the calculated relative position in the second direction and the absolute position in the second direction at the image capture time.

3. The method of claim 1, wherein the error value comprises error value components in each of first and second orthogonal directions;
   and wherein the step of determining the error value comprises:
      calculating velocities in the first and second direction at the first sample time, based on the measurements acquired from the one or more sensors in the device;
      calculating the relative position in the first direction at the image capture time as the relative position in the first direction at the first sample time plus the product of the velocity in the first direction at the first sample time multiplied by the difference between the image capture time and the first sample time;
      calculating the relative position in the second direction at the image capture time as the relative position in the second direction at the first sample time plus the product of the velocity in the second direction at the first sample time multiplied by the difference between the image capture time and the first sample time;
      determining the error value in the first direction as the difference between the calculated relative position in the first direction and the absolute position in the first direction at the image capture time; and
      determining the error value in the second direction as the difference between the calculated relative position in the second direction and the absolute position in the second direction at the image capture time.

4. The method of claim 1, wherein the error value comprises error value components in each of first and second orthogonal directions;

and wherein the step of determining the error value comprises:

calculating velocities in the first and second direction at the second sample time, based on the measurements acquired from the one or more sensors in the device;

calculating the relative position in the first direction at the image capture time as the relative position in the first direction at the second sample time minus the velocity in the first direction at the second sample time multiplied by the difference between the second sample time and the image capture time;

calculating the relative position in the second direction at the image capture time as the relative position in the second direction at the second sample time minus the velocity in the second direction at the second sample time multiplied by the difference between the second sample time and the image capture time;

determining the error value in the first direction as the difference between the calculated relative position in the first direction and the absolute position in the first direction at the image capture time; and determining the error value in the second direction as the difference between the calculated relative position in the second direction and the absolute position in the second direction at the image capture time.

5. The method of claim 1, wherein the step of adjusting the one or more relative locations comprises:

determining the compensation value from the product of a weighting factor and the error value;

adding the compensation value to each of the one or more relative locations.

6. The method of claim 5, wherein the step of determining the compensation value comprises:

generating a first compensation value for a first direction by multiplying a first weighting factor for the first direction and a component of the error value in the first direction;

generating a second compensation value for a second direction, orthogonal to the first direction, by multiplying a second weighting factor for the second direction and a component of the error value in the second direction, the second weighting factor differing from the first weighting factor;

and wherein the adding step comprises:

adding the first compensation value to the component of the relative location at the selected point in time in the first direction; and adding the second compensation value to the component of the relative location at the selected point in time in the second direction.

7. The method of claim 5, wherein the step of determining the compensation value comprises:

determining the absolute location by recovering a positioning target pattern within the portion of the display captured in the capturing step;

and further comprising:

generating the weighting factor responsive to the position of the positioning target pattern within the captured portion of the display.

8. The method of claim 1, wherein the capturing step comprises:

capturing image data representative of at least a portion of the display including the positioning target, over a sequence of frames, the positioning target pattern corresponding to complementary intensity variances at one or more selected pixel locations of consecutive frames in the sequence;

wherein the step of determining the absolute location at the display comprises:

processing image data to subtract first and second successive frames of the captured image data from one another to recover the positioning target pattern as viewed remotely from the display;

determining a first pointed-to location at the display responsive to the recovered positioning target pattern;

responsive to the step of determining the first pointed-to-location completing within a selected delay time following the capturing of image data from the second frame, selecting the first pointed-to location as the absolute location and the time at which image data was captured from the second frame as the image capture time; and responsive to the step of determining the first pointed-to-location completing after the selected delay time following the capturing of image data from the second frame:

then processing image data to subtract the second frame and a third successive frame of the captured image data from one another to recover the positioning target pattern as viewed remotely from the display;

determining a second pointed-to location at the display responsive to the recovered positioning target pattern; and selecting the second pointed-to location as the absolute location and the time at which image data was captured from the third frame as the image capture time.

9. The method of claim 1, wherein the adjusting step is repeated for a plurality of relative locations to derive a plurality of corrected locations;

and further comprising:

interpolating at least one virtual corrected location at a point in time between successive ones of the corrected locations.

10. The method of claim 1, wherein the adjusting step is repeated for a plurality of relative locations to derive a plurality of corrected locations;

and further comprising:

predicting at least one virtual corrected location at a point in time later than a most recent one of the corrected locations.

11. The method of claim 1, further comprising:

determining a plurality of relative locations of the display at which the device is pointing at times prior to the first sample time; and after the step of determining the error value, adjusting each of the plurality of relative locations prior to the first sample time by a compensation value corresponding to the error value.

12. The method of claim 1, wherein the step of determining a relative location comprises:

detecting the distance of movement of the device at a sample time, relative to a prior sample time for which a relative location was determined;

transforming the detected distance into a number of pixels of the display by multiplying the distance by a transformation multiplier; and adding the number of pixels to the relative location at the prior sample time.

13. The method of claim 12, further comprising:

generating a first transformation multiplier for a first direction by multiplying a pixel density in the first direction by a first ratio of a change in absolute location in the first direction between two image capture times to a change in relative location in the first direction between the two image capture times; and generating a second transformation multiplier for a second direction, orthogonal to the first direction, by multiplying a pixel density in the second direction by a second ratio of a change in absolute location in the second direction between two image capture times to a change in relative location in the second direction between the two image capture times;

wherein the detecting step detects the distance of movement in each of the first and second directions;

and wherein the transforming step comprises:

multiplying the distance in the first direction by the first transformation multiplier; and multiplying the distance in the second direction by the second transformation multiplier.

14. The method of claim 13, wherein the step of generating the first transformation multiplier further comprises:

multiplying the product of the pixel density in the first direction and the first ratio by a first weighting factor;

and wherein the step of generating the second transformation multiplier further comprises:

multiplying the product of the pixel density in the second direction and the second ratio by a second weighting factor.

15. The method of claim 1, further comprising:

responsive to the error value exceeding a tolerance limit, discarding the absolute location from use in the step of determining the error value.

16. The method of claim 1, further comprising:

repeating the step of determining the error value for a plurality of later sample times, the time duration between the first and second sample times and the later sample times corresponding to the magnitude of the error value.

17. The method of claim 1, wherein the capturing step comprises:

capturing image data representative of at least a portion of the display including a positioning target, over a sequence of frames including first and second frames;

wherein the step of determining the absolute location at the display comprises:

determining one or more of roll, pitch, yaw, and linear motion of the device based on measurements from the one or more sensors; and correcting the positioning target pattern in the captured image data from one of the frames relative to a previous frame, responsive to the one or more of roll, pitch, yaw, and linear motion of the device; and processing captured image data from the first and second successive frames of the captured image data to recover the positioning target pattern as viewed remotely from the display; and determining the absolute location at the display responsive to the recovered positioning target pattern.

18. The method of claim 1, wherein the step of evaluating motion of the handheld device is based on measurements acquired from a plurality of inertial sensors for sensing relative motion in each of three orthogonal directions, the inertial sensors selected from a group consisting of accelerometers, gyroscopes, magnetic field sensors, and combinations thereof.

19. The method of claim 18, wherein the step of evaluating motion of the handheld device is based also on measurements acquired from an image capture subsystem.

20. The method of claim 1, wherein the step of evaluating motion of the handheld device is based on measurements acquired from an image capture subsystem.

21. The method of claim 1, wherein the capturing step comprises:

capturing image data representative of at least a portion of the display including a positioning target, over a sequence of frames;

and wherein the step of determining an absolute location at the display at which the device is pointing at an image capture time comprises:

identifying an element in the captured image data from one frame in the sequence; and analyzing a portion of the captured image data from another, later, frame in the sequence, the portion selected responsive to results of the evaluating step, to identify the element in the selected portion; and determining the absolute location at the display from matching elements in the captured image data from those frames.

22. A method of operating a computer system including a handheld human interface device, comprising:

displaying image frame data on a display;

capturing, at a handheld human interface device, image data representative of at least a portion of the display including a positioning target pattern, over a sequence of frames, the positioning target pattern corresponding to complementary intensity variances at one or more selected pixel locations of consecutive frames in the sequence;

determining an absolute location at the display at which the device is pointing at an image capture time;

evaluating motion of the handheld device based on measurements acquired from one or more sensors in the device;

for each of a plurality of sample times, determining a relative location at the display by:

capturing image data including the positioning target pattern at sample times during display of a first frame and a third frame in the sequence, wherein the first, a second, and the third frames are consecutive in time in the sequence; and detecting a change in position in the positioning target pattern by comparing the locations of the positioning target pattern in the captured image data from the first and third frames;

determining an error value between the absolute location at the image capture time and a calculated relative location at the image capture time calculated from the relative locations at first and second sample times; and then adjusting one or more relative locations by a compensation value corresponding to the error value.

23. The method of claim 22, further comprising:

determining relative locations of the display at which the device is pointing at times corresponding to each of the first and third frames; and estimating the location at the display at which the device is pointing at a time corresponding to the second frame by linear interpolation between the relative locations at the times corresponding to the first and third frames.

24. The method of claim 22, further comprising:

determining locations of the display at which the device is pointing at times corresponding to each of the first and third frames;

determining a velocity of motion of the device at the time of the first frame, based on the measurements from the one or more sensors; and estimating the location at the display at which the device is pointing at a time corresponding to the second frame based on the determined velocity and a time differential between the times corresponding to the first and second frames.

25. The method of claim 22, further comprising:
determining locations of the display at which the device is pointing at times corresponding to each of the first and third frames;
determining a velocity of motion of the device at the time of the third frame, based on the measurements from the one or more sensors; and
estimating the location at the display at which the device is pointing at a time corresponding to the second frame based on the determined velocity and a time differential between the times corresponding to the second and third frames.

26. The method of claim 22, further comprising:
determining locations of the display at which the device is pointing at times corresponding to each of the first and third frames;
determining velocities of motion at the times of each of the first and third frames, based on the measurements from the one or more sensors;
estimating a first location at the display at which the device is pointing at a time corresponding to the second frame based on the determined velocity at the time of the first frame and a time differential between the times corresponding to the first and second frames;
estimating a second location at the display at which the device is pointing at a time corresponding to the second frame based on the determined velocity at the time of the third frame and a time differential between the times corresponding to the second and third frames; and
determining the location at the display at which the device is pointing at a time corresponding to the second frame based on an average of the first and second locations.

27. The method of claim 22, further comprising:
capturing image data including the positioning target pattern at sample times during display of the second frame and a fourth frame in the sequence, the fourth frame consecutive in time with the third frame in the sequence;
detecting motion of the device between times corresponding to the second and fourth frames in the sequence, based on measurements acquired from the one or more sensors;
determining an angle of motion at the time corresponding to the third frame from the detected motion of the device between the times corresponding to the second and fourth frames;
estimating an angle of motion at the time corresponding to the second frame from the determined angle of motion at the time corresponding to the third frame; and
determining a location at the display at which the device is pointing at the time corresponding to the second frame, based on the estimated angle of motion.

28. An interactive display system, comprising:
a computer for generating display image data to be displayed on a display;
graphics output circuitry for generating graphics output signals corresponding to the display image data in a format suitable for display;
a pointing device, comprising:
a hand-held housing;
an image sensor disposed in the housing;
means for sensing motion of the handheld device; and
image capture circuitry for capturing image data obtained by the image sensor; and
positioning circuitry for determining a location at the display at which the pointing device is aimed by performing a plurality of operations comprising:
determining an absolute location at the display at which the device is pointing at an image capture time;
evaluating motion of the handheld device based on measurements acquired from the motion sensing means;
for each of a plurality of sample times including a first sample time earlier in time than the image capture time and a second sample time later in time than the image capture time, determining a relative location at the display at which the device is pointing based on the evaluated motion of the device relative to a prior sample time;
calculating, from the relative locations determined at the first and second sample times, a calculated relative location at the image capture time;
determining an error value between the absolute location at the image capture time and the calculated relative location; and
then adjusting one or more relative locations by a compensation value corresponding to the error value.

29. The system of claim 28, wherein the motion sensing means comprises:
a plurality of inertial sensors for sensing relative motion in each of three orthogonal directions, the inertial sensors selected from a group consisting of accelerometers, gyroscopes, magnetic field sensors, and combinations thereof.

30. The system of claim 29, wherein the motion sensing means comprises:
the image sensor; and
the image capture subsystem.

31. The system of claim 28, wherein the motion sensing means comprises:
the image sensor; and
the image capture subsystem.

32. The system of claim 28, wherein the error value comprises error value components in each of first and second orthogonal directions;
and wherein the operation of determining the error value comprises:
calculating the relative position at the image capture time in the first direction as a ratio of the relative position in the first direction at the first sample time multiplied by the difference between the second sample time and the image capture time, plus the relative position in the first direction at the second sample time multiplied by the difference between the image capture time and the first sample time, to the difference between the first and second sample times;
calculating the relative position at the image capture time in the second direction as a ratio of the relative position in the second direction at the first sample time multiplied by the difference between the second sample time and the image capture time, plus the relative position at the second sample time in the second direction multiplied by the difference between the image capture time and the first sample time, to the difference between the first and second sample times;
determining the error value in the first direction as the difference between the calculated relative position in the first direction and the absolute position in the first direction at the image capture time; and determining the error value in the second direction as the difference between the calculated relative position in the second direction and the absolute position in the second direction at the image capture time.

33. The system of claim 28, wherein the error value comprises error value components in each of first and second orthogonal directions;
and wherein the operation of determining the error value comprises:
calculating velocities in the first and second direction at the first sample time, based on the measurements acquired from the sensing means;
calculating the relative position in the first direction at the image capture time as the relative position in the first direction at the first sample time plus the product of the velocity in the first direction at the first sample time multiplied by the difference between the image capture time and the first sample time;
calculating the relative position in the second direction at the image capture time as the relative position in the second direction at the first sample time plus the product of the velocity in the second direction at the first sample time multiplied by the difference between the image capture time and the first sample time;
determining the error value in the first direction as the difference between the calculated relative position in the first direction and the absolute position in the first direction at the image capture time; and
determining the error value in the second direction as the difference between the calculated relative position in the second direction and the absolute position in the second direction at the image capture time.

34. The system of claim 28, wherein the error value comprises error value components in each of first and second orthogonal directions;
and wherein the operation of determining the error value comprises:
calculating velocities in the first and second direction at the second sample time, based on the measurements acquired from the sensing means;
calculating the relative position in the first direction at the image capture time as the relative position in the first direction at the second sample time minus the velocity in the first direction at the second sample time multiplied by the difference between the second sample time and the image capture time;
calculating the relative position in the second direction at the image capture time as the relative position in the second direction at the second sample time minus the velocity in the second direction at the second sample time multiplied by the difference between the second sample time and the image capture time;
determining the error value in the first direction as the difference between the calculated relative position in the first direction and the absolute position in the first direction at the image capture time; and
determining the error value in the second direction as the difference between the calculated relative position in the second direction and the absolute position in the second direction at the image capture time.

35. The system of claim 28, wherein the operation of adjusting the one or more relative locations comprises:
determining the compensation value from the product of a weighting factor and the error value;
adding the compensation value to each of the one or more relative locations.

36. The system of claim 35, wherein the operation of determining the compensation value comprises:
generating a first compensation value for a first direction by multiplying a first weighting factor for the first direction and a component of the error value in the first direction;
generating a second compensation value for a second direction, orthogonal to the first direction, by multiplying a second weighting factor for the second direction and a component of the error value in the second direction, the second weighting factor differing from the first weighting factor;
and wherein the adding operation comprises:
adding the first compensation value to the component of the relative location at the selected point in time in the first direction; and
adding the second compensation value to the component of the relative location at the selected point in time in the second direction.

37. The system of claim 35, wherein the operation of determining the compensation value comprises:
determining the absolute location by recovering a positioning target pattern within the portion of the display captured in the capturing step;
and wherein the plurality of operations further comprises:
generating the weighting factor responsive to the position of the positioning target pattern within the captured portion of the display.

38. The system of claim 28, wherein the capturing operation comprises:
capturing image data representative of at least a portion of the display including the positioning target, over a sequence of frames, the positioning target pattern corresponding to complementary intensity variances at one or more selected pixel locations of consecutive frames in the sequence;
wherein the operation of determining the absolute location at the display comprises:
processing image data to subtract first and second successive frames of the captured image data from one another to recover the positioning target pattern as viewed remotely from the display;
determining a first pointed-to location at the display responsive to the recovered positioning target pattern;
responsive to the step of determining the first pointed-to-location completing within a selected delay time following the capturing of image data from the second frame, selecting the first pointed-to location as the absolute location and the time at which image data was captured from the second frame as the image capture time; and
responsive to the step of determining the first pointed-to-location completing after the selected delay time following the capturing of image data from the second frame:
then processing image data to subtract the second frame and a third successive frame of the captured image data from one another to recover the positioning target pattern as viewed remotely from the display;
determining a second pointed-to location at the display responsive to the recovered positioning target pattern; and
selecting the second pointed-to location as the absolute location and the time at which image data was captured from the third frame as the image capture time.

39. The system of claim 28, wherein the adjusting operation is repeated for a plurality of relative locations to derive a plurality of corrected locations;
and further comprising:

interpolating at least one virtual corrected location at a point in time between successive ones of the corrected locations.

40. The system of claim 28, wherein the adjusting operation is repeated for a plurality of relative locations to derive a plurality of corrected locations;
and further comprising:
predicting at least one virtual corrected location at a point in time later than a most recent one of the corrected locations.

41. The system of claim 28, wherein the plurality of operations further comprises:
determining a plurality of relative locations of the display at which the device is pointing at times prior to the first sample time; and
after the operation of determining the error value, adjusting each of the plurality of relative locations prior to the first sample time by a compensation value corresponding to the error value.

42. The system of claim 28, wherein the operation of determining a relative location comprises:
detecting the distance of movement of the device at a sample time, relative to a prior sample time for which a relative location was determined;
transforming the detected distance into a number of pixels of the display by multiplying the distance by a transformation multiplier; and
adding the number of pixels to the relative location at the prior sample time.

43. The system of claim 42, wherein the plurality of operations further comprises:
generating a first transformation multiplier for a first direction by multiplying a pixel density in the first direction by a first ratio of a change in absolute location in the first direction between two image capture times to a change in relative location in the first direction between the two image capture times; and
generating a second transformation multiplier for a second direction, orthogonal to the first direction, by multiplying a pixel density in the second direction by a second ratio of a change in absolute location in the second direction between two image capture times to a change in relative location in the second direction between the two image capture times;
wherein the detecting operation detects the distance of movement in each of the first and second directions;
and wherein the transforming operation comprises:
multiplying the distance in the first direction by the first transformation multiplier; and
multiplying the distance in the second direction by the second transformation multiplier.

44. The system of claim 43, wherein the operation of generating the first transformation multiplier further comprises:
multiplying the product of the pixel density in the first direction and the first ratio by a first weighting factor;
and wherein the operation of generating the second transformation multiplier further comprises:
multiplying the product of the pixel density in the second direction and the second ratio by a second weighting factor.

45. The system of claim 28, further comprising:
responsive to the error value exceeding a tolerance limit, discarding the absolute location from use in the operation of determining the error value.

46. The system of claim 28, further comprising:
repeating the operation of determining the error value for a plurality of later sample times, the time duration between the first and second sample times and the later sample times corresponding to the magnitude of the error value.

47. The system of claim 28, wherein the capturing operation comprises:
capturing image data representative of at least a portion of the display including a positioning target, over a sequence of frames including first and second frames;
wherein the operation of determining the absolute location at the display comprises:
determining one or more of roll, pitch, yaw, and linear motion of the device based on measurements from the sensing means; and
correcting the positioning target pattern in the captured image data from one of the frames relative to a previous frame, responsive to the one or more of roll, pitch, yaw, and linear motion of the device; and
processing captured image data from the first and second successive frames of the captured image data to recover the positioning target pattern as viewed remotely from the display; and
determining the absolute location at the display responsive to the recovered positioning target pattern.

48. The system of claim 28, wherein the capturing operation comprises:
capturing image data representative of at least a portion of the display including a positioning target, over a sequence of frames;
and wherein the operation of determining an absolute location at the display at which the device is pointing at an image capture time comprises:
identifying an element in the captured image data from one frame in the sequence; and
analyzing a portion of the captured image data from another, later, frame in the sequence, the portion selected responsive to results of the evaluating operation, to identify the element in the selected portion; and
determining the absolute location at the display from matching elements in the captured image data from those frames.

49. An interactive display system comprising:
a computer for generating display image data to be displayed on a display;
graphics output circuitry for generating graphics output signals corresponding to the display image data in a format suitable for display;
a pointing device, comprising:
a hand-held housing;
an image sensor disposed in the housing;
means for sensing motion of the handheld device; and
image capture circuitry for capturing image data obtained by the image sensor representative of at least a portion of the display including a positioning target pattern, over a sequence of frames, the positioning target pattern corresponding to complementary intensity variances at one or more selected pixel locations of consecutive frames in the sequence; and
positioning circuitry for determining a location at the display at which the pointing device is aimed by performing a plurality of operations comprising:
determining an absolute location at the display at which the device is pointing at an image capture time;
evaluating motion of the handheld device based on measurements acquired from the motion sensing means;
for each of a plurality of sample times, determining a relative location at the display at which the device is pointing based on the evaluated motion of the device relative to a prior sample time, from captured image data including the positioning target pattern at sample times during display of a first frame and a third frame in the sequence, wherein the first, a second, and the third frames are consecutive in time in the sequence, by detecting a change in position in the positioning target pattern by comparing the locations of the positioning target pattern in the captured image data from the first and third frames;

determining an error value between the absolute location at the image capture time and a calculated relative location at the image capture time calculated from the relative locations at first and second sample times; and then adjusting one or more relative locations by a compensation value corresponding to the error value.

50. The system of claim 49, wherein the plurality of operations further comprises:

determining relative locations of the display at which the device is pointing at times corresponding to each of the first and third frames; and estimating the location at the display at which the device is pointing at a time corresponding to the second frame by linear interpolation between the relative locations at the times corresponding to the first and third frames.

51. The system of claim 49, wherein the plurality of operations further comprises:

determining locations of the display at which the device is pointing at times corresponding to each of the first and third frames;

determining a velocity of motion of the device at the time of the first frame, based on the measurements from the sensing means; and estimating the location at the display at which the device is pointing at a time corresponding to the second frame based on the determined velocity and a time differential between the times corresponding to the first and second frames.

52. The system of claim 49, wherein the plurality of operations further comprises:

determining locations of the display at which the device is pointing at times corresponding to each of the first and third frames;

determining a velocity of motion of the device at the time of the third frame, based on the measurements from the sensing means; and estimating the location at the display at which the device is pointing at a time corresponding to the second frame based on the determined velocity and a time differential between the times corresponding to the second and third frames.

53. The system of claim 49, wherein the plurality of operations further comprises:

determining locations of the display at which the device is pointing at times corresponding to each of the first and third frames;

determining velocities of motion at the times of each of the first and third frames, based on the measurements from the sensing means;

estimating a first location at the display at which the device is pointing at a time corresponding to the second frame based on the determined velocity at the time of the first frame and a time differential between the times corresponding to the first and second frames;

estimating a second location at the display at which the device is pointing at a time corresponding to the second frame based on the determined velocity at the time of the third frame and a time differential between the times corresponding to the second and third frames; and determining the location at the display at which the device is pointing at a time corresponding to the second frame based on an average of the first and second locations.

54. The system of claim 49, wherein the plurality of operations further comprises:

capturing image data including the positioning target pattern at sample times during display of the second frame and a fourth frame in the sequence, the fourth frame consecutive in time with the third frame in the sequence;

detecting motion of the device between times corresponding to the second and fourth frames in the sequence, based on measurements acquired from the sensing means;

determining an angle of motion at the time corresponding to the third frame from the detected motion of the device between the times corresponding to the second and fourth frames;

estimating an angle of motion at the time corresponding to the second frame from the determined angle of motion at the time corresponding to the third frame; and determining a location at the display at which the device is pointing at the time corresponding to the second frame, based on the estimated angle of motion.

* * * * *